(12) United States Patent
Lee et al.

(10) Patent No.: US 12,047,884 B2
(45) Date of Patent: Jul. 23, 2024

(54) ELECTRONIC DEVICE TRANSMITTING REFERENCE SIGNAL AND METHOD FOR OPERATING THEREOF

(71) Applicant: SAMSUNG ELECTRONICS CO., LTD., Suwon-si (KR)

(72) Inventors: Youngkwon Lee, Suwon-si (KR); Youngjun Park, Suwon-si (KR); Hyungjoon Yu, Suwon-si (KR); Hyoungjoo Lee, Suwon-si (KR); Jongho Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 484 days.

(21) Appl. No.: 17/449,345

(22) Filed: Sep. 29, 2021

(65) Prior Publication Data
US 2022/0104148 A1    Mar. 31, 2022

Related U.S. Application Data

(63) Continuation of application No. PCT/KR2021/013151, filed on Sep. 27, 2021.

(30) Foreign Application Priority Data

Sep. 29, 2020 (KR) .................. 10-2020-0127307

(51) Int. Cl.
*H04W 4/00* (2018.01)
*H04W 52/24* (2009.01)
(Continued)

(52) U.S. Cl.
CPC ....... *H04W 52/325* (2013.01); *H04W 52/241* (2013.01); *H04W 52/367* (2013.01)

(58) Field of Classification Search
CPC ............. H04W 52/325; H04W 52/241; H04W 52/367; H04W 36/00222; H04W 28/0861
See application file for complete search history.

(56) References Cited

U.S. PATENT DOCUMENTS

2008/0280638 A1    11/2008    Malladi et al.
2011/0081935 A1     4/2011    Yeon et al.
(Continued)

FOREIGN PATENT DOCUMENTS

JP    2014-534693    12/2014
JP    2019-506062     2/2019
(Continued)

OTHER PUBLICATIONS

International Search Report and Written Opinion dated Dec. 28, 2021 in corresponding International Application No. PCT/KR2021/013151.
(Continued)

*Primary Examiner* — Omoniyi Obayanju
(74) *Attorney, Agent, or Firm* — Nixon & Vanderhye, P.C.

(57) ABSTRACT

According to various embodiments, an electronic device may include: multiple antennas configured to support long-term evolution (LTE) communication and new radio (NR) communication; a memory configured to store association information between first multiple output powers used for the LTE communication and second multiple output powers used for the NR communication corresponding to the first multiple output powers respectively, and at least one processor, wherein the at least one processor is configured to: configure an LTE transmission power to be used for data transmission in a physical uplink shared channel (PUSCH) of the LTE communication, identify a first NR output power maximum value corresponding to the LTE transmission power based on the association information, identify a
(Continued)

sounding reference signal (SRS) output power to be used for SRS transmission through at least one of the multiple antennas, and at least temporarily reduce the LTE transmission power based on the SRS output power being greater than the first NR output power maximum value.

15 Claims, 26 Drawing Sheets

(51) Int. Cl.
*H04W 52/32* (2009.01)
*H04W 52/36* (2009.01)

(56) References Cited

U.S. PATENT DOCUMENTS

| | | |
|---|---|---|
| 2011/0280169 A1 | 11/2011 | Seo et al. |
| 2013/0089044 A1 | 4/2013 | Park et al. |
| 2015/0181533 A1 | 6/2015 | Chen et al. |
| 2017/0171859 A1 | 6/2017 | Nimbalker et al. |
| 2019/0007911 A1 | 1/2019 | Xu et al. |
| 2019/0045505 A1 | 2/2019 | Yang et al. |
| 2019/0141729 A1 | 5/2019 | Hosseini et al. |
| 2019/0387481 A1 | 12/2019 | Yang et al. |
| 2020/0107279 A1* | 4/2020 | Sun ................ H04W 52/367 |
| 2020/0245258 A1 | 7/2020 | Wang et al. |
| 2020/0295895 A1 | 9/2020 | Wu et al. |
| 2020/0404593 A1 | 12/2020 | Yao et al. |
| 2022/0158794 A1* | 5/2022 | Zhang ................ H04L 5/0064 |

FOREIGN PATENT DOCUMENTS

| | | |
|---|---|---|
| KR | 10-2009-0120487 | 11/2009 |
| KR | 10-2011-0036492 | 4/2011 |
| KR | 10-2016-0101044 | 8/2016 |
| KR | 10-2016-0111886 | 9/2016 |
| KR | 10-2019-0102105 | 9/2019 |
| KR | 10-2020-0087223 | 7/2020 |
| WO | 18/165592 | 9/2018 |

OTHER PUBLICATIONS

CATT, Correction on Power Sharing for EN DC, R1-1800267, 3GPP TSG RAN WG1 Meeting NR Ad Hoc, Vancouver, Canada, Jan. 13, 2018.
Apple, Discussion on EN-DC Power Control, R1-1811122, 3GPP TSG RAN WG1 Meeting#94bis, Chengdu, China, Sep. 29, 2018.
ZTE, Further consideration on the report of PHR in EN-DC, R2-1801929, 3GPP TSG RAN WG2 Meeting#101, Athens, Greece, Feb. 14, 2018.
Huawei, General considerations on UL power control design, R1-1712234, 3GPP TSG RAN WG1 Meeting#90, Prague, Czech Republic, Aug. 12, 2017.

* cited by examiner

ELECTRONIC DEVICE TRANSMITTING REFERENCE SIGNAL AND METHOD FOR OPERATING THEREOF

CROSS-REFERENCE TO RELATED APPLICATIONS

This application is a continuation of International Application No. PCT/KR2021/013151 designating the United States, filed on Sep. 27, 2021, in the Korean Intellectual Property Receiving Office and claiming priority to Korean Patent Application No. 10-2020-0127307, filed on Sep. 29, 2020, in the Korean Intellectual Property Office, the disclosures of which are incorporated by reference herein in their entireties.

BACKGROUND

Field

The disclosure relates to an electronic device for transmitting a reference signal and an operation method therefor.

Description of Related Art

As mobile communication technologies have developed, portable terminals that provide various functions have become popular. Accordingly, an effort to develop a 5th generation (5G) communication system is being made in order to meet wireless data traffic demand which is increasing. In order to achieve a high data transmission rate, the 5G communication system considers, in addition to implementation in frequency bands used in the 3G communication system and the long-term evolution (LTE) communication system, implementation in higher frequency bands (e.g., 25-60 GHz band) so as to provide a faster data transmission rate.

As a 5G communication implementation scheme, a stand-alone (SA) scheme and a non-stand-alone (NSA) scheme are considered. The NSA scheme among the SA and NSA schemes may include an EN-DC (LTE NR—dual connectivity) scheme using a new radio (NR) system together with the existing LTE system. In the NSA scheme, a user terminal may use a gNB of the NR system as well as an eNB of the LTE system. A technology that enables heterogeneous communication systems for a user terminal may be referred to as dual connectivity.

Dual connectivity was first proposed by third generation partnership project (3GPP) release-12, and when proposed for the first time, in addition to the LTE system, dual connectivity using a 3.5 GHz frequency band as a small cell was proposed. In the case of the EN-DC scheme of 5G, it is under discussion to implement the dual connectivity proposed by 3GPP release-12 and release-15 so that LTE network communication is used as a master node and NR network communication is used as a secondary node.

In an electronic device, in order to transmit a signal from the electronic device to a communication network (e.g., base station), data generated by a processor or a communication processor may be transmitted to the outside of the electronic device through an antenna after the signal is processed via a radio frequency integrated circuit (RFIC) and a radio frequency front end (RFFE) circuit (hereinafter, referred to as "RFFE" for convenience of description).

The electronic device may transmit, via the RFFE through at least one antenna, a reference signal (e.g., sounding reference signal (SRS)) referenced for channel estimation by a base station of the communication network. The base station may perform multi-antenna signal processing or beamforming processing by estimating a channel on the basis of the reference signal transmitted from the electronic device. The electronic device may improve data reception performance by receiving the multi-antenna signal-processed or beamforming-processed signal from the base station.

A user equipment (UE) has limitation in an output power. For example, the user equipment may have a threshold value (e.g., UE maximum output power of 3GPP technical specification (TS) 38.101) of the output power according to a UE power class, and may be configured not to generate an output power exceeding the threshold value. If multiple radio access technologies (RATs) are concurrently used (e.g., ENDC or NEDC), an electronic device may be configured so that the sum of output powers by the multiple RATs does not exceed the threshold value. Dynamic power sharing (DPS) may refer to pairs of various output power values for each RAT so that the sum of output powers by multiple RATs does not exceed the threshold value.

If ENDC is used, the electronic device may have limitation in a maximum output power available in NR due to an output power of LTE communication. As the maximum output power available in NR is limited, the electronic device may not be able to transmit an SRS with a sufficient magnitude. Limitation of an SRS transmission power may cause a decrease in a downlink throughput.

SUMMARY

Embodiments of the disclosure provide an electronic device and an operation method therefor in which, if, while using ENDC, an SRS transmission power based on NR is limited due to dynamic power sharing with LTE, the SRS may be transmitted with a sufficient transmission power by temporarily limiting an output power of LTE communication (e.g., transmission power of PUSCH).

According to various example embodiments, an electronic device may include multiple antennas configured to support LTE communication and NR communication, a memory configured to store association information between first multiple output powers used for the LTE communication and second multiple output powers used for the NR communication corresponding to the first multiple output powers respectively, and at least one processor, wherein the second multiple output powers may include maximum values to be used in the NR communication, which are limited by the first multiple output powers respectively, based on the LTE communication and the NR communication being concurrently performed, and the at least one processor may be configured to configure an LTE transmission power to be used for data transmission in a physical uplink shared channel (PUSCH) of the LTE communication, identify a first NR output power maximum value corresponding to the LTE transmission power based on the association information, identify a sounding reference signal (SRS) output power to be used for SRS transmission through at least one of the multiple antennas, and at least temporarily reduce the LTE transmission power based on the SRS output power being greater than the first NR output power maximum value. The sum of the LTE transmission power and the first NR output power maximum value may be less than a maximum output power configured for the electronic device.

According to various example embodiments, an electronic device may include: multiple antennas configured to support LTE communication and NR communication, a memory configured to store association information between first multiple output powers used for the LTE communication and second multiple output powers used for the NR communication and corresponding to the first multiple output powers, respectively, at least one processor, and at least one amplifier configured to amplify and apply sounding reference signals (SRSs) to the multiple antennas respectively, wherein the second multiple output powers may include maximum values to be used in the NR communication, which are limited by the first multiple output powers respectively, based on the LTE communication and the NR communication being concurrently performed, and the at least one processor may be configured to: configure an LTE transmission power to be used for data transmission in a physical uplink shared channel (PUSCH) of the LTE communication, identify a first NR output power maximum value corresponding to the LTE transmission power based on the association information, identify a sounding reference signal (SRS) output power to be used for SRS transmission through at least one of the multiple antennas, identify an actual SRS power based on the SRS output power, a maximum output of the at least one amplifier, and multiple RF path-losses corresponding to the respective multiple antennas, and at least temporarily reduce the LTE transmission power based on the actual SRS power being greater than the first NR output power maximum value. The sum of the LTE transmission power and the first NR output power maximum value may have a value smaller than a maximum output power configured for the electronic device.

Various example embodiments may provide an electronic device and an operation method therefor, wherein, when an NR-based SRS transmission power is limited according to dynamic power sharing while using ENDC, an SRS can be transmitted with sufficient transmission power by temporarily limiting an output power of LTE communication. SRS transmission with a sufficient transmit power may enable an increase in downlink throughput.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
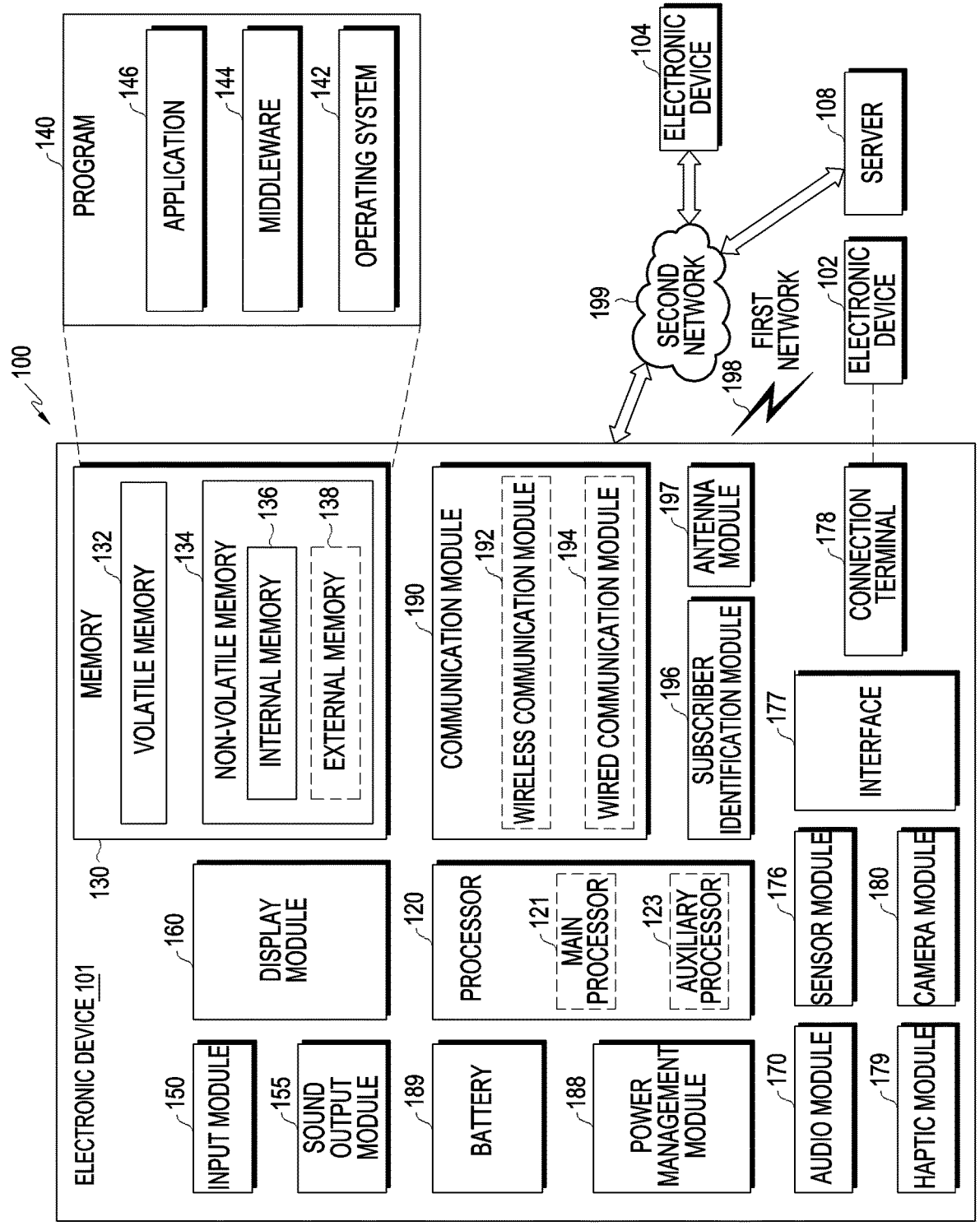
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
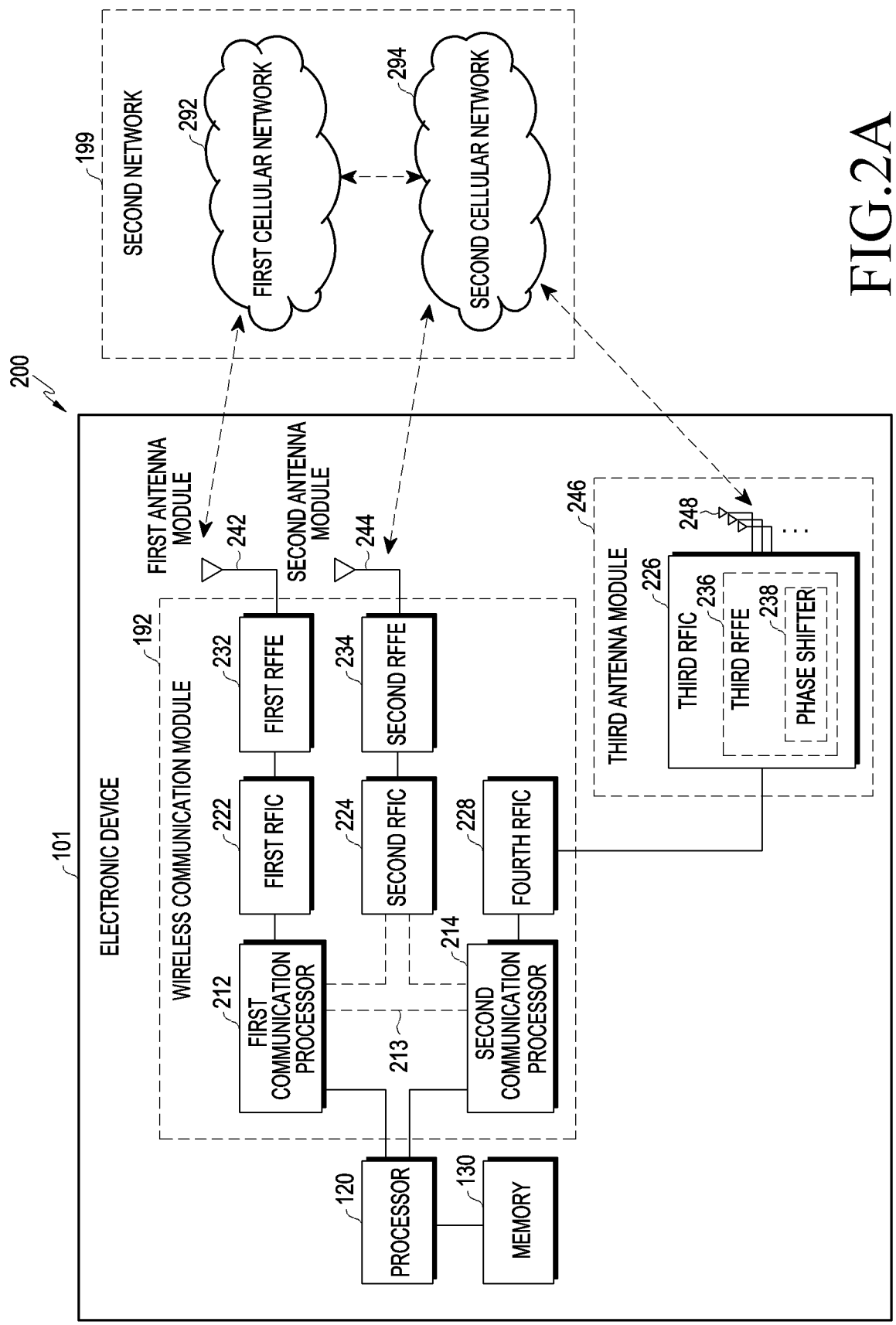
FIG. 2A and FIG. 2B are block diagrams illustrating the electronic device that supports legacy network communication and 5G network communication according to various embodiments.

FIG. 2A is a block diagram 200 illustrating the electronic device 101 that supports legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to various embodiments, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or may be included as a part of the third RFIC 226.

The first communication processor 212 may support establishment of a communication channel of a band to be used for wireless communication with the first cellular network 292, and legacy network communication via the established communication channel. According to various embodiments, the first cellular network may be a legacy network including a second generation (2G), 3G, 4G, or long-term evolution (LTE) network. The second communication processor 214 may support establishment of a communication channel corresponding to a designated band (e.g., about 6 GHz to about 60 GHz) among bands to be used for wireless communication with the second cellular network 294, and 5G network communication via the established communication channel. According to various embodiments, the second cellular network 294 may be a 5G network defined by 3GPP. In addition, according to an embodiment, the first communication processor 212 or the second communication processor 214 may support establishment of a communication channel corresponding to another designated band (e.g., about 6 GHz or lower) among the bands to be used for wireless communication with the second cellular network 294, and 5G network communication via the established communication channel.

The first communication processor 212 may transmit data to or receive data from the second communication processor 214. For example, data that has been classified to be transmitted over the second cellular network 294 may be changed to be transmitted over the first cellular network 292. In this case, the first communication processor 212 may receive transmission data from the second communication processor 214. For example, the first communication processor 212 may transmit data or receive data from the second communication processor 214 via an inter-processor interface 213. The inter-processor interface 213 may be implemented as, for example, a universal asynchronous receiver/transmitter (UART) (e.g., high speed (HS)-UART) or a peripheral component interconnect bus express (PCIe) interface, but the type thereof is not limited. Alternatively, the first communication processor 212 and the second communication processor 214 may exchange control information and packet data information using, for example, a shared memory. The first communication processor 212 may transmit or receive various information to or from the second communication processor 214, the various information including sensing information, information on output strength, and resource block (RB) allocation information.

Depending on implementation, the first communication processor 212 may not be directly connected to the second communication processor 214. In this case, the first communication processor 212 may transmit data to or receive data from the second communication processor 214 via the processor 120 (e.g., application processor). For example, the first communication processor 212 and the second communication processor 214 may transmit or receive data via the processor 120 (e.g., application processor) and an HS-UART interface or a PCIe interface, but the type of the interface is not limited. The first communication processor 212 and the second communication processor 214 may exchange control information and packet data information using the processor 120 (e.g., application processor) and the shared memory.

Figure 2B:
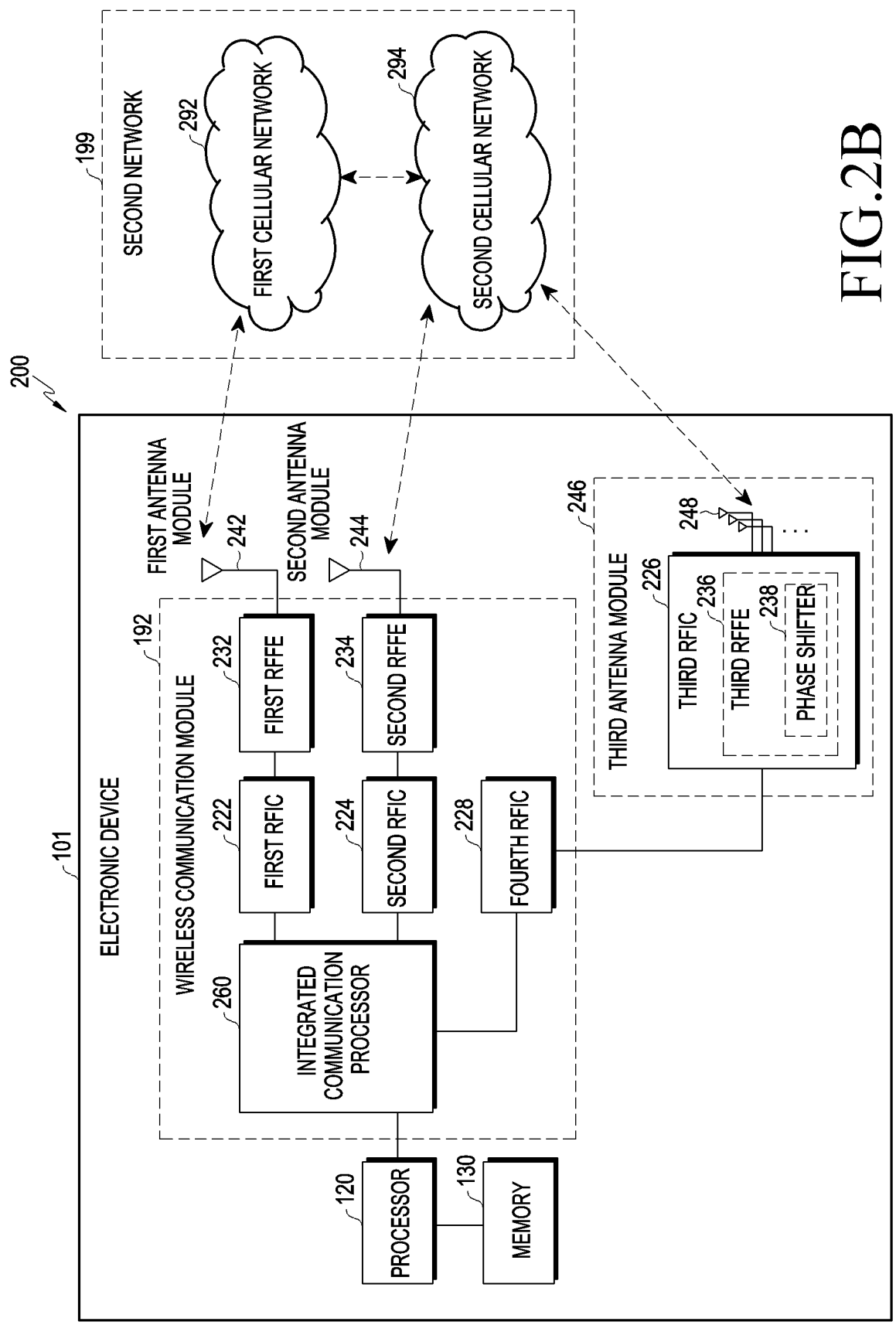

According to an embodiment, the first communication processor 212 and the second communication processor 214 may be implemented in a single chip or a single package. According to various embodiments, the first communication processor 212 or the second communication processor 214 may be implemented, in a single chip or a single package, together with the processor 120, an auxiliary processor 123, or the communication module 190. For example, as shown in FIG. 2B, an integrated communication processor (e.g., including processing circuitry) 260 may support functions for communication with both the first cellular network 292 and the second cellular network 294.

The first RFIC 222 may convert, during transmission, a baseband signal generated by the first communication processor 212 into a radio frequency (RF) signal of about 700 MHz to about 3 GHz used for the first cellular network 292 (e.g., legacy network). During reception, the RF signal may be acquired from the first network 292 (e.g., legacy network) via an antenna (e.g., first antenna module 242) and may be preprocessed via RFFE (e.g., first RFFE 232). The first RFIC 222 may convert the preprocessed RF signal into a baseband signal so as to be processed by the first communication processor 212.

The second RFIC 224 may convert, during transmission, a baseband signal generated by the first communication processor 212 or the second communication processor 214 into an RF signal (hereinafter, a 5G Sub6 RF signal) of a Sub6 band (e.g., about 6 GHz or lower) used for the second cellular network 294 (e.g., 5G network). During reception, the 5G Sub6 RF signal may be acquired from the second cellular network 294 (e.g., 5G network) via an antenna (e.g., second antenna module 244) and may be preprocessed via RFFE (e.g., second RFFE 234). The second RFIC 224 may convert the preprocessed 5G Sub6 RF signal into a baseband signal so as to be processed by a communication processor corresponding to one of the first communication processor 212 or the second communication processor 214.

The third RFIC 226 may convert a baseband signal generated by the second communication processor 214 into an RF signal (hereinafter, 5G Above 6 RF signal) of a 5G Above 6 band (e.g., about 6 GHz to about 60 GHz) to be used for the second cellular network 294 (e.g., 5G network). During reception, the 5G Above 6 RF signal may be acquired from the second cellular network 294 (e.g., 5G network) via an antenna (e.g., antenna 248) and may be preprocessed via the third RFFE 236. The third RFIC 226 may convert the preprocessed 5G Above 6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 separately from or as at least a part of the third RFIC 226. In this case, the fourth RFIC 228 may convert a baseband signal generated by the second communication processor 214 into an RF signal (hereinafter, IF signal) of an intermediate frequency band (e.g., about 9 GHz to about 11 GHz), and then may transfer the IF signal to the third RFIC 226. The third RFIC 226 may convert the IF signal into a 5G Above 6 RF signal. During reception, the 5G Above 6 RF signal may be received from the second cellular network 294 (e.g., 5G network) via an antenna (e.g., antenna 248) and may be converted to an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as at least a part of a single package or a single chip. According to various embodiments, in FIG. 2A or FIG. 2B, when implemented as a single chip or a single package, the first RFIC 222 and the second RFIC 224 may be implemented as an integrated RFIC. In this case, the integrated RFIC may be connected to the first RFFE 232 and the second RFFE 234 so as to convert a baseband signal into a signal of a band supported by the first RFFE 232 and/or the second RFFE 234, and the converted signal may be transmitted to one of the first RFFE 232 and the second RFFE 234. According to an embodiment, the first RFFE 232 and the second RFFE 234 may be implemented as at least a part of a single package or a single chip. According to an embodiment, at least one of the first antenna module 242 or the second antenna module 244 may be omitted, or may be combined with another antenna module so as to process RF signals in multiple corresponding bands.

According to an embodiment, the third RFIC 226 and the antenna 248 may be disposed on the same substrate so as to form a third antenna module 246. For example, the wireless communication module 192 or the processor 120 may be disposed on a first substrate (e.g., main PCB). In this case, the third RFIC 226 may be disposed in a partial area (e.g., bottom surface) of a second substrate (e.g., sub-PCB) separate from the first substrate, and the antenna 248 may be disposed in another area partial area (e.g., top surface), thereby forming the third antenna module 246. By placing the third RFIC 226 and the antenna 248 on the same substrate, it is possible to reduce the length of a transmission line therebetween. This, for example, may reduce the loss (e.g., attenuation) of a signal, which is caused due to a transmission line, in a high frequency band (e.g., about 6 GHz to about 60 GHz) used for 5G network communication. Accordingly, the electronic device 101 may improve the quality or speed of communication with the second cellular network 294 (e.g., 5G network).

According to an embodiment, the antenna 248 may be formed as an antenna array including multiple antenna elements that may be used for beamforming. In this case, the third RFIC 226 may include, for example, multiple phase shifters 238 corresponding to the multiple antenna elements, as parts of the third RFFE 236. During transmission, each of the multiple phase shifters 238 may convert the phase of a 5G Above 6 RF signal to be transmitted to the outside of the electronic device 101 (e.g., base station of a 5G network) via a corresponding antenna element. During reception, each of the multiple phase shifters 238 may convert the phase of the 5G Above 6 RF signal received from the outside via the corresponding antenna element, into the same or substantially the same phase. This enables transmission or reception via beamforming between the electronic device 101 and the outside.

The second cellular network 294 (e.g., 5G network) may be operated independently of (e.g., stand-alone (SA) or in connection with (e.g., non-stand alone (NSA)) the first cellular network 292 (e.g., legacy network). For example, the 5G network may have only an access network (e.g., 5G radio access network (RAN) or next generation RAN (NG RAN)) and may not have a core network (e.g., next generation core (NGC)). In this case, the electronic device 101 may access the access network of the 5G network, and then may access an external network (e.g., Internet) under the control of a core network (e.g., evolved packed core (EPC)) of the legacy network. Protocol information (e.g., LTE protocol information) for communication with the legacy network or protocol information (e.g., new radio (NR) protocol information) for communication with the 5G network may be stored in the memory 230 and may be accessed by other components (e.g., processor 120, first communication processor 212, or second communication processor 214).

Figure 3A:
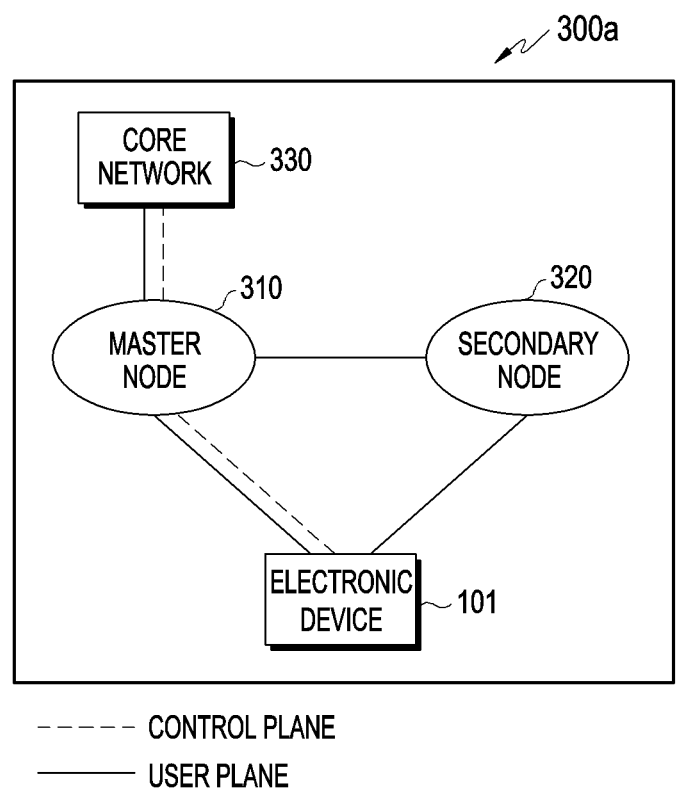
FIG. 3A, FIG. 3B, and FIG. 3C are diagrams illustrating wireless communication systems that provide networks of legacy communication and/or 5G communication according to various embodiments.
Figure 3B:
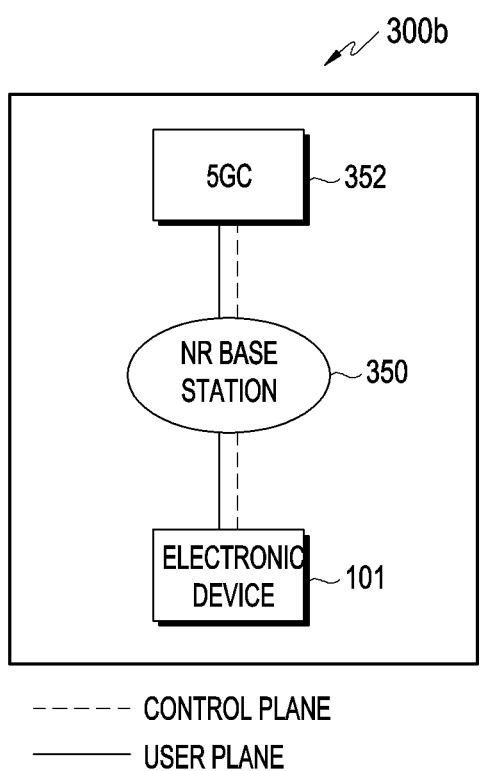
Figure 3C:
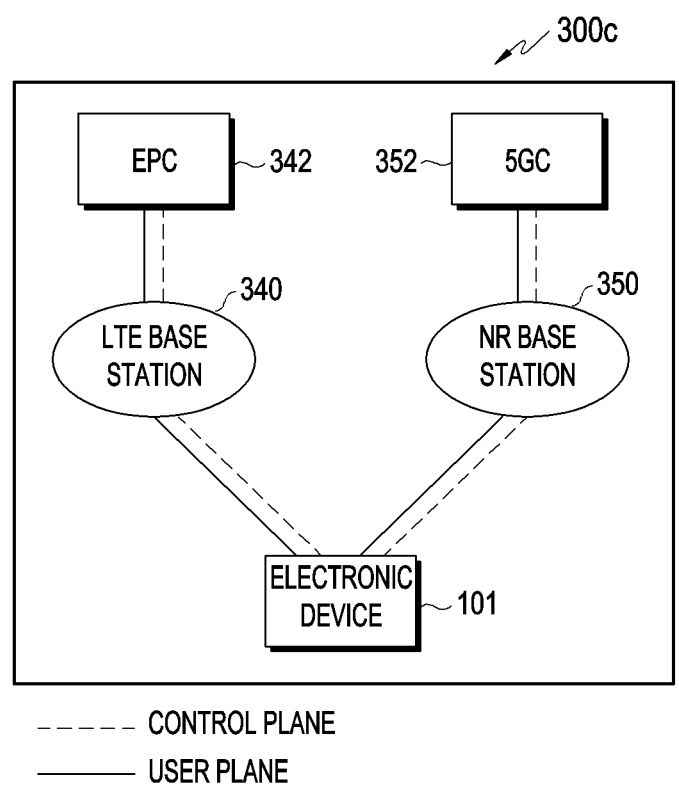

FIG. 3A, FIG. 3B, and FIG. 3C are diagrams illustrating wireless communication systems that provide networks of legacy communication and/or 5G communication according to various embodiments. Referring to FIG. 3A, FIGS. 3B and 3C, network environments 300a to 300c may include at least one of a legacy network and a 5G network. The legacy network may include, for example, a 4G or LTE base station 340 (e.g., eNodeB (eNB)) of the 3GPP standard supporting a wireless access of the electronic device 101, and an evolved packet core (EPC) 342 which manages 4G communication. The 5G network may include, for example, a new radio (NR) base station 350 (e.g., gNodeB (gNB)) supporting a wireless access of the electronic device 101, and a 5th generation core (5GC) 352 which manages 5G communication of the electronic device 101.

According to various embodiments, the electronic device 101 may transmit or receive a control message and user data through a legacy communication and/or 5G communication. The control message may include a message related to at least one of, for example, security control, bearer setup, authentication, registration, or mobility management of the electronic device 101. The user data may refer to, for example, user data except for a control message transmitted or received between the electronic device 101 and a core network 330 (e.g., EPC 342).

Referring to FIG. 3A, the electronic device 101 according to an embodiment may transmit or receive at least one of a control message or user data to or from at least part (e.g., NR base station 350 and 5GC 352) of the 5G network using at least a part (e.g., LTE base station 340 and EPC 342) of the legacy network.

According to various embodiments, the network environment 300a may include a network environment which provides wireless communication dual connectivity (DC) to the LTE base station 340 and the NR base station 350 and transmits or receives a control message to or from the electronic device 101 through one core network 330 of the EPC 342 or the 5GC 352.

According to various embodiments, in a DC environment, one of the LTE base station 340 and the NR base station 350 may operate as a master node (MN) 310 and the other may operate as a secondary node (SN) 320. The MN 310 may be connected to the core network 330 and transmit or receive a control message to or from the core network 330. The MN 310 and the SN 320 may be connected to each other via a network interface so as to transmit or receive a message related to management of radio resources (e.g., communication channel) to or from each other.

According to various embodiments, the MN 310 may include the LTE base station 340, the SN 320 may include the NR base station 350, and the core network 330 may include the EPC 342. For example, a control message may be transmitted or received via the LTE base station 340 and the EPC 342, and user data may be transmitted or received via at least one of the LTE base station 340 or the NR base station 350.

According to various embodiments, the MN 310 may include the NR base station 350, the SN 320 may include the LTE base station 340, and the core network 330 may include the 5GC 352. For example, a control message may be transmitted or received via the NR base station 350 and the 5GC 352, and user data may be transmitted or received via at least one of the LTE base station 340 or the NR base station 350.

Referring to FIG. 3B, according to various embodiments, the 5G network may include an NR base station 350 and a 5GC 352, and may transmit or receive a control message and user data independently of the electronic device 101.

Referring to FIG. 3C, the legacy network and the 5G network according to various embodiments may transmit or receive data independently of each other. For example, the electronic device 101 and the EPC 342 may transmit or receive a control message and user data via the LTE base station 340. For another example, the electronic device 101 and the 5GC 352 may transmit or receive a control message and user data via the NR base station 350.

According to various embodiments, the electronic device 101 may be registered with at least one of the EPC 342 or the 5GC 352 so as to transmit or receive a control message.

According to various embodiments, the EPC 342 or the 5GC 352 may interwork to manage communication of the electronic device 101. For example, movement information of the electronic device 101 may be transmitted or received via an interface between the EPC 342 and the 5GC 352.

As described above, dual connectivity via the LTE base station 340 and the NR base station 350 may be referred to as E-UTRA new radio dual connectivity (EN-DC).

Figure 4A:
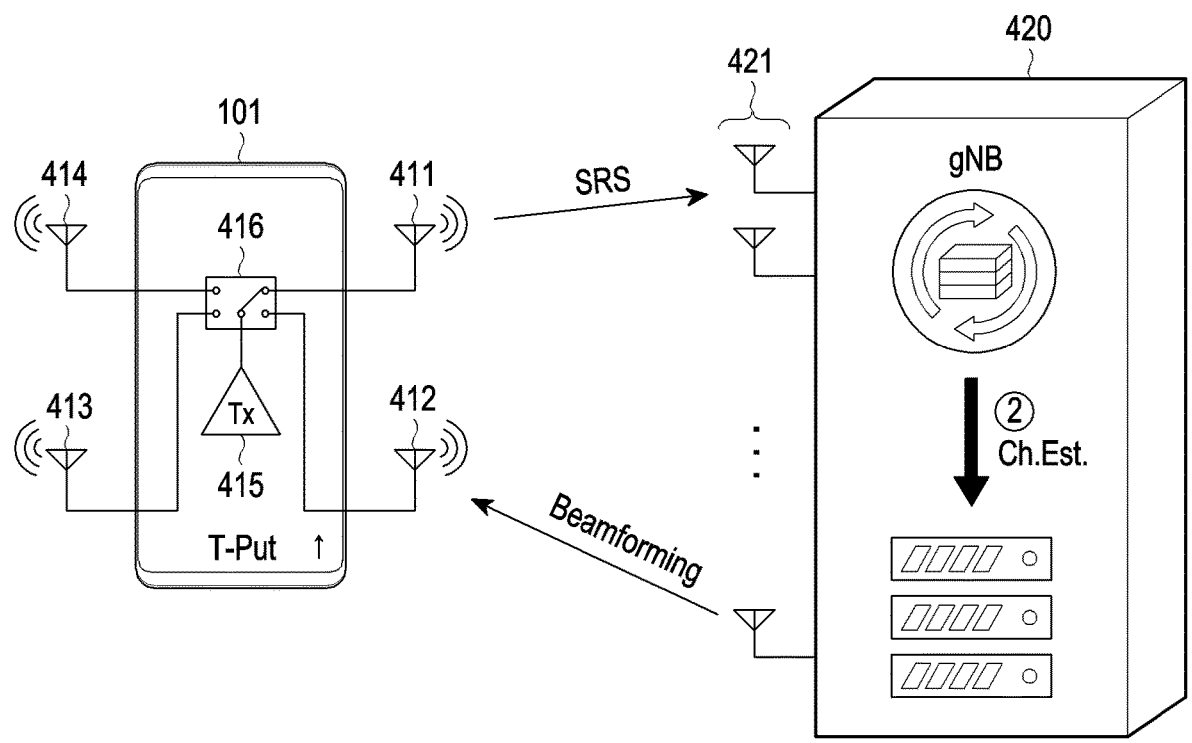
FIG. 4A and FIG. 4B are diagrams illustrating example reference signal transmission of the electronic device according to various embodiments.
Figure 4B:
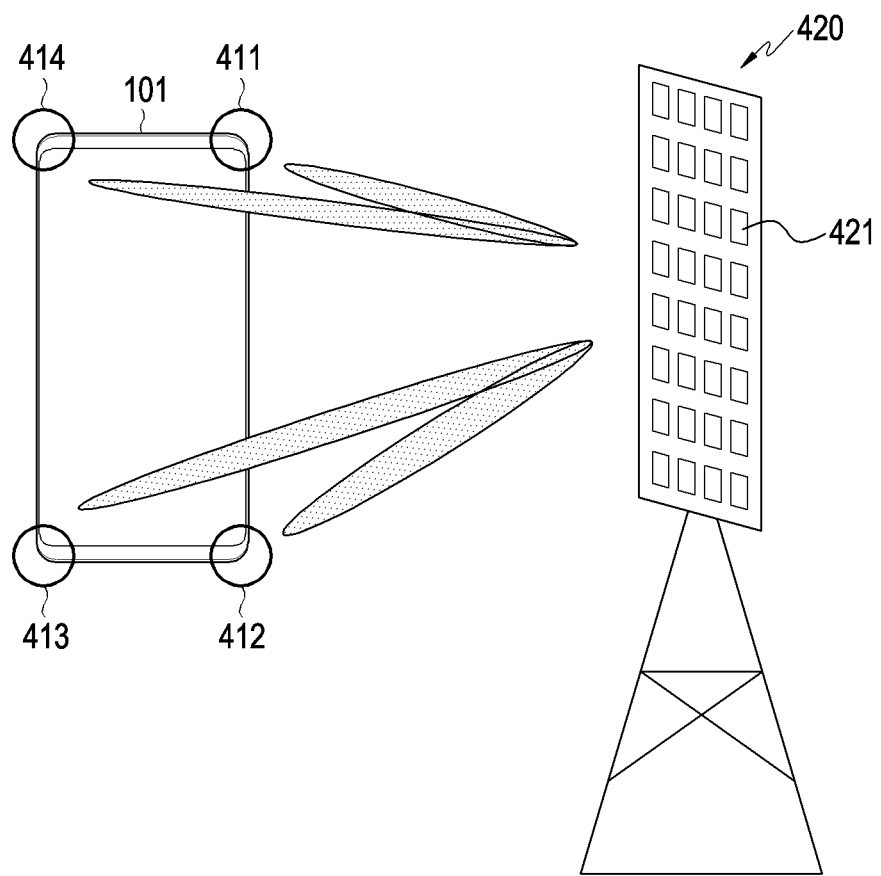

FIG. 4A and FIG. 4B are diagrams illustrating reference signal transmission of the electronic device according to various embodiments. Referring to FIG. 4A, the electronic device 101 (e.g., electronic device 101 of FIG. 1) may transmit a reference signal (e.g., SRS) through four antennas (e.g., first antenna 411, second antenna 412, third antenna 413, and fourth antenna 414). For example, the electronic device 101 may amplify a reference signal via at least one power amplifier (PA) 415, and may transmit, via the at least one switch 416, the amplified reference signal to the first antenna 411, the second antenna 412, the third antenna 413, and the fourth antenna 414. A reference signal (e.g., SRS) transmitted through each antenna (e.g., first antenna 411, second antenna 412, third antenna 413, and fourth antenna 414) of the electronic device 101) may be received through each antenna 421 of a base station 420 (e.g., gNB).

According to various embodiments, the base station 420 may receive a reference signal transmitted from the electronic device 101, and may perform channel estimation for each antenna (e.g., first antenna 411, second antenna 412, third antenna 413, and fourth antenna 414) of the electronic device 410 on the basis of the received reference signal. The base station 420 may transmit a beamformed signal to each antenna of the electronic device 101, based on the channel estimation. Although an SRS is designed for uplink channel estimation, in a case of a 5G TDD band, transmission and reception frequencies are the same, and it is thus possible that the base station receives the SRS transmitted from the electronic device 101 so as to perform downlink channel estimation. The electronic device 101 estimates a downlink channel using the reference signal transmitted by the base station and selects channel state information (CSI) and a precoding matrix indicator (PMI), but there is limitation to accuracy due to restriction of a communication bit. However, when the base station performs channel estimation using the SRS, precoding is possible without restriction of accuracy, and a downlink throughput may be thus improved.

In FIG. 4A, for convenience of description, the power amplifier 415 and the switch 416 are illustrated to be one and are illustrated as being connected to multiple antennas (first antenna 411, second antenna 412, third antenna 413, and fourth antenna 414), but those skilled in the art will readily understand that the disclosure is not limited thereto.

Referring to FIG. 4B, the base station 420 may transmit a signal (e.g., beamformed signal) through an array antenna 421 including multiple (e.g., 32) antennas. MIMO communication may be possible based on multiple antennas. A signal transmitted from the base station 420 may be received through each antenna (e.g., first antenna 411, second antenna 412, third antenna 413, and fourth antenna 414) of the electronic device 101, and as illustrated in FIG. 4B, communication with respect to each antenna (e.g., first antenna 411, second antenna 412, third antenna 413, and fourth antenna 414) of the electronic device 101 may be performed by MIMO communication of the base station 420. In an example, the signal may be received in the form of a beam directed to each antenna (e.g., first antenna 411, second antenna 412, third antenna 413, and fourth antenna 414) of the electronic device 101.

As illustrated in 4A and 4B, when the electronic device 101 transmits a reference signal (e.g., SRS) through multiple transmission paths, the base station 420 may perform beamforming by identifying a channel environment with each antenna (e.g., first antenna 411, second antenna 412, third antenna 413, and fourth antenna 414) of the electronic device 101, and as a result, a reference signal received power (RSRP) and/or a signal to noise ratio (SNR) of a downlink channel may be improved. If the RSRP and/or SNR of the downlink channel are improved, a rank index (RI) or a channel quality indicator (CQI) for the electronic device may be increased. The base station 420 may assign a high rank or modulation and code schemes (MCS) to the electronic device 101 on the basis of the improved performance of the electronic device 101, so that a downlink throughput of the electronic device 101 may be improved.

However, if an SRS transmission power is insufficient, there may be a case where a gain of the downlink throughput of the electronic device 101 is not large. When the SRS transmission power is limited according to DPS, the electronic device 101 according to various embodiments may transmit the SRS with sufficient transmission power by temporarily backing off an output power of LTE communication, and this will be described later.

According to various embodiments, the base station 420 may use a downlink reference signal for downlink channel estimation. For example, when the base station 420 transmits the downlink reference signal to the electronic device 101, the electronic device 101 may receive the downlink reference signal transmitted from the base station 420 so as to perform channel estimation. The electronic device 101 may transmit a channel estimation result to the base station 420, and the base station 420 may perform downlink beamforming with reference to the channel estimation result transmitted from the electronic device 101. According to various embodiments, when the base station 420 performs channel estimation based on the reference signal (e.g., SRS) transmitted from the electronic device 101, the channel estimation may be performed faster than the channel estimation based on the downlink reference signal.

According to various embodiments, a first communication network (e.g., base station (gNB)) or a second communication network (e.g., base station (eNB)) may request various pieces of configuration information of the electronic device 101 by transmitting a UE capability inquiry message to the electronic device 101. For example, the first communication network (e.g., base station (gNB)) or the second communication network (e.g., base station (eNB)) may request information related to a reception antenna of the electronic device 101 via the UE capability inquiry message. The electronic device 101 may receive the UE capability inquiry message from the first communication network or the second communication network, and may transmit a UE capability information message to the first communication network or the second communication network in response thereto. According to various embodiments, the UE capability information message may include information related to the reception antenna of the electronic device 101, such as "supportedSRS-TxPortSwitch t1r4", corresponding to the contents of the UE capability inquiry message.

As antenna-related information is described as "supportedSRS-TxPortSwitch t1r4", the first communication network may determine that the electronic device 101 is capable of transmitting a signal using four reception antennas, and, with respect to the four antennas, information on a time point at which a reference signal (e.g., SRS) is transmitted to each antenna may be included in an RRC Reconfiguration message so as to be transmitted.

Figure 5:
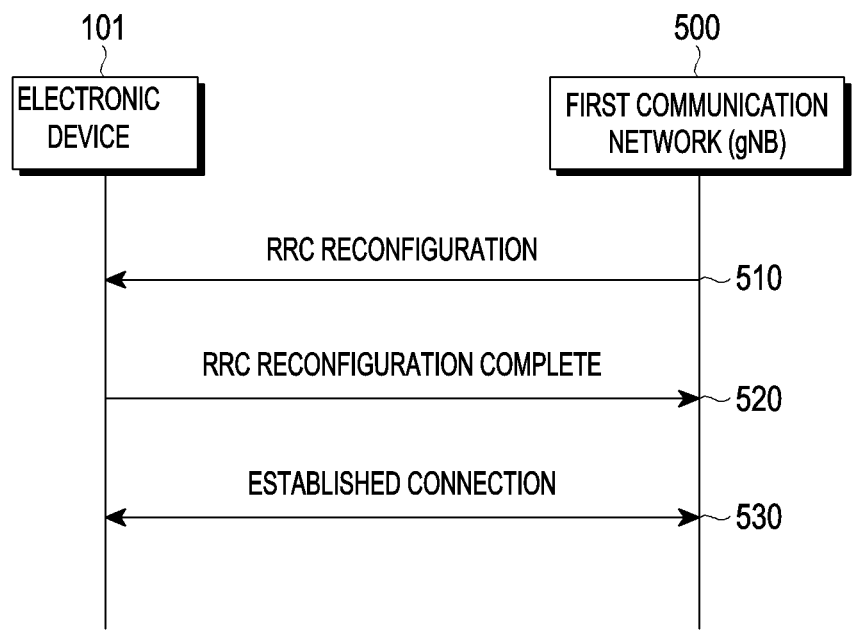
FIG. 5 is a signal flow diagram illustrating an example signal transmission or reception procedure between the electronic device and a communication network according to various embodiments.

FIG. 5 is a signal flow diagram illustrating an example signal transmission or reception procedure between the electronic device and a communication network according to various embodiments. Referring to FIG. 5, the electronic device 101 (e.g., at least one of the processor 120, the first communication processor 212, the second communication processor 214, or the integrated communication processor 260) may establish an RRC connection with a first communication network (e.g., base station (gNB)) 500 via a random access channel (RACH) procedure.

According to various embodiments, in operation 510, a first communication network 500 may transmit an RRC Reconfiguration message to the electronic device 101. For example, the first communication network 500 may transmit an RRC Reconfiguration message in response to the RRC Request message transmitted by the electronic device 101. As described above, in the RRC Reconfiguration message, information on a time point at which the electronic device 101 transmits a reference signal (e.g., SRS) to each antenna may be included as follows:

perodicityAndOffset-p s120: 17
perodicityAndOffset-p s120: 7
perodicityAndOffset-p s120: 13
perodicityAndOffset-p s120: 3
nrofSymbols n1

Referring to the RRC Reconfiguration message, as described in"nrofSymbols n1.", it may be seen that a duration of SRS transmission is determined according to an assigned symbol. Referring to the RRC Reconfiguration message, a first SRS is configured, as described in "periodicityAndOffset-p s120: 17", to be transmitted in a 17th slot while being transmitted once every 20 slots, a second SRS is configured, as described in "periodicityAndOffset-p s120: 7", to be transmitted in a seventh slot while being transmitted once every 20 slots, a third SRS is configured, as described in "periodicityAndOffset-p s120: 13", to be transmitted in a 13th slot while being transmitted once every 20 slots, and a fourth SRS is configured, as described in "periodicityAndOffset-p s120: 3", to be transmitted in a 3rd slot while being transmitted once every 20 slots.

According to various embodiments, the electronic device 101 may transmit four SRSs in every 20 slots at different times through each antenna according to the configuration of RRC Reconfiguration. The size of one slot may be determined by subcarrier spacing (SCS). For example, when the SCS is 30 KHz, a time interval of one slot may be 0.5 ms, and time intervals of 20 slots may be 10 ms. Accordingly, the electronic device 101 may repeatedly transmit an SRS at different times through each antenna in every 10 ms period. According to various embodiments, one slot may include 14 symbols, and if it is assumed that 1 symbol is assigned for one SRS transmission, a symbol duration (or symbol enable time) of 0.5 ms*1/14=35 μs (0.035 ms) may be obtained.

According to various embodiments, in operation 520, the electronic device 101 may transmit an RRC Reconfiguration Complete message to the first communication network 500. As the RRC Reconfiguration is normally completed, in operation 530, the electronic device 101 and the first communication network 500 may complete RRC connection establishment.

According to various embodiments, as described above, the electronic device 101 may transmit, on the basis of information relating to a transmission time point of a reference (e.g., SRS) received from the first communication network 500, the reference signal at different times in each configured time period (e.g., 10 ms) through each antenna transmission path.

Figure 6:
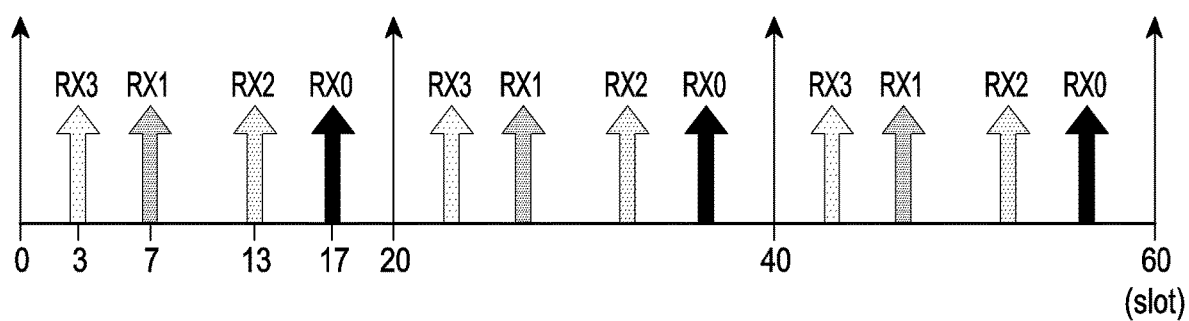
FIG. 6 is a diagram illustrating a transmission period of a reference signal according to various embodiments.

FIG. 6 is a diagram illustrating a transmission period of a reference signal according to various embodiments. Referring to FIG. 6, for example, the electronic device 101 (e.g., at least one of the processor 120, the first communication processor 212, the second communication processor 214, or the integrated communication processor 260) may, every 10 ms, transmit a first SRS (corresponding to RX0) in a 17th slot among 20 slots, transmit a second SRS (corresponding to RX1) in a seventh slot, transmit a third SRS (corresponding to RX2) in a 13th slot, and transmit a fourth SRS (corresponding to RX3) in a third slot. As another example, the electronic device 101 (e.g., at least one of the processor 120, the first communication processor 212, the second communication processor 214, or the integrated communication processor 260) may, every 10 ms, transmit the first SRS (corresponding to RX3) in the third slot among 20 slots, transmit the second SRS (corresponding to RX1) in the seventh slot, transmit a third SRS (corresponding to RX2) in the 13th slot, and transmit a fourth SRS (corresponding to RX0) in the 17th slot. Once the determined correspondence is maintained without change, implementation may be performed in various ways.

According to various embodiments, a reference signal may be a sounding reference signal (SRS) used for multi-antenna signal processing (e.g., multi input multi output (MIMO) or beamforming) through uplink channel state measurement, but is not limited thereto. For example, in the above description or the following description, an SRS is described as an example of a reference signal, but any type of uplink reference signal (e.g., uplink demodulation reference signal (DM-RS)) transmitted from the electronic device 101 to a base station may be included in a reference signal to be described below.

Figure 7A:
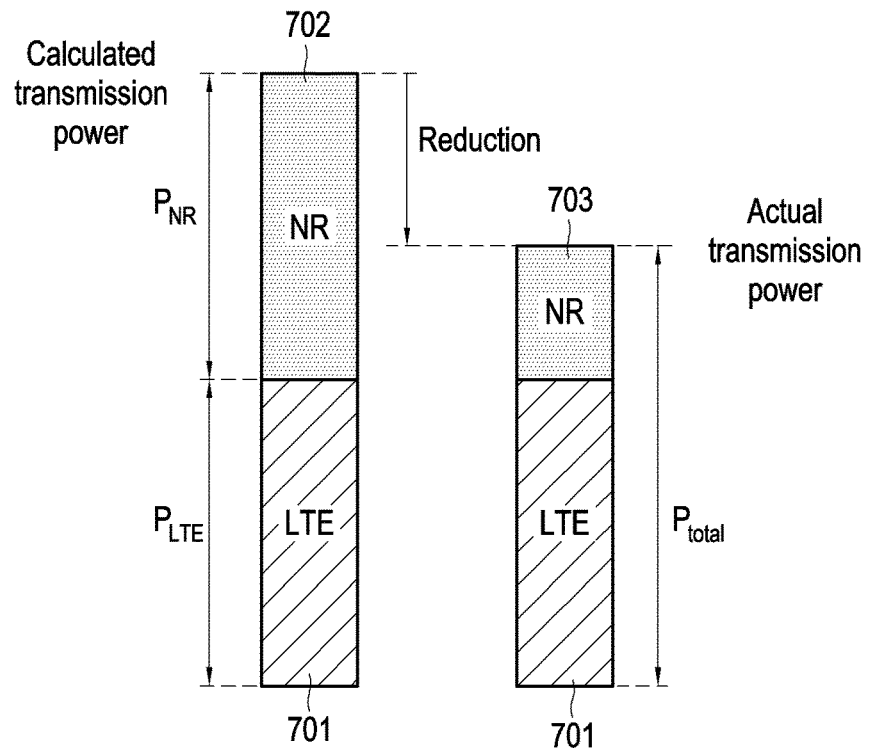
FIG. 7A is a diagram illustrating an output power for each RAT according to dynamic power sharing according to various embodiments.

FIG. 7A is a diagram illustrating an output power for each RAT according to dynamic power sharing according to various embodiments.

According to various embodiments, a maximum output power (e.g., UE maximum output power based on 3GPP technical specification (TS) 38.101) may be configured in the electronic device 101 (e.g., at least one of the processor 120, the first communication processor 212, the second communication processor 214, or the integrated communication processor 260). Here, a maximum output power may be, for example, a value defined in an antenna connector of the antennas (e.g., antennas 411, 412, 413, and 414 of FIG. 4) of the electronic device 101, but there is no limitation on points at which a maximum output power or various powers to be described later can be defined, in addition to the antenna connector. A maximum output power may be defined, for example, for each band and power class, and a predetermined tolerance may be additionally configured. For example, in an n41 band, with respect to class 3, 23 dBm having a tolerance of $\pm 2^3$ dB may be configured as a maximum output power. The electronic device 101 may transmit a communication signal with a transmission power equal to or less than a maximum output power, and those skilled in the art may understand that a maximum output power or less in various embodiments indicates a maximum output power or less obtained in consideration of a tolerance.

According to various embodiments, the electronic device 101 may use ENDC based on LTE and NR. In this case, LTE may be configured to be MCG, and NR may be configured to be SCG. Even when the electronic device 101 uses two RATs at the same time, the sum of output powers corresponding to the two RATs should satisfy a maximum output power or less which is configured in the electronic device 101. In this case, an output power of LTE communication that is MCG may be preferentially configured, and an output power of NR communication that is SCG may be limited.

Referring to FIG. 7A, the electronic device 101 may configure a first magnitude 701 of an output power ($P_{LTE}$) of LTE communication and may configure a second magnitude 702 of an output power ($P_{NR}$) of NR communication. The electronic device 101 may determine that the sum of both output powers exceeds the maximum output power configured for the electronic device 101. Accordingly, the electronic device 101 may reduce the second magnitude 702 of the output power ($P_{NR}$) of NR communication to a third magnitude 703 while maintaining the first magnitude 701 of the output power ($P_{LTE}$) of LTE communication. The sum of the first magnitude 701 and the third magnitude 703 may be equal to or less than the maximum output power configured in the electronic device 101.

According to various embodiments, multiple power values for dynamic power sharing may be stored, as shown in Table 1, in the memory 130 of the electronic device 101. Association information of Table 1 may be, for example, association information indicating that $P_{LTE}$ is y when $P_{max\_NR\_SRS}$ is X.

TABLE 1

| $P_{LTE}$ (dBm) | 23 | 22 | 21 | 20 | 19 | 18 | 17 |
|---|---|---|---|---|---|---|---|
| $P_{max\_NR\_DPS}$ (dBm) | 17 | 18 | 19 | 20 | 21 | 22 | 23 |

For example, if the output power ($P_{LTE}$) of LTE communication is 23 dBm, a maximum output power value ($P_{max\_NR\_DPS}$) of NR communication according to DPS may be 17 dBm, and in this case, 24 dBm which is the sum of 23 dBm (200 mW) and 17 dBm (50 mW) may be limited within a maximum output power within the tolerance. In Table 1, for example, the numerical sum in dBm of the output powers of both RATs is configured to be 40, but this is merely an example. There is no limitation as long as the sum of actual output powers of both RATs is a transmission power pair equal to or less than the maximum output power.

If the output power ($P_{LTE}$) of LTE communication is relatively large, the maximum output power value $P_{max\_NR\_DPS}$ of NR communication according to DPS is configured to be relatively small, and the electronic device 101 transmits an SRS with a relatively small magnitude. For example, if the output power ($P_{LTE}$) of LTE communication is 23 dBm, the maximum output power value $P_{max\_NR\_DPS}$ of NR communication according to DPS is 17 dBm, and thus the electronic device 101 is unable to transmit the SRS with a magnitude exceeding 17 dBm. A decrease in an SRS transmission power causes a decrease in a downlink throughput. The electronic device 101 according to various embodiments may adjust an output power ($P_{LTE}$) of LTE communication while transmitting an SRS. For example, if the output power ($P_{LTE}$) of LTE communication is backed off to 17 dBm, a maximum output power value ($P_{max\_NR\_DPS}$) of NR communication may increase to 23 dBm. The electronic device 101 may transmit the SRS with a transmission power equal to or less than the increased maximum value, and the SRS transmission power may increase.

Accordingly, a decrease in a downlink throughput may be prevented and/or reduced. Adjustment of the output power ($P_{LTE}$) of the LTE communication of the electronic device 101 will be described later.

Figure 7B:
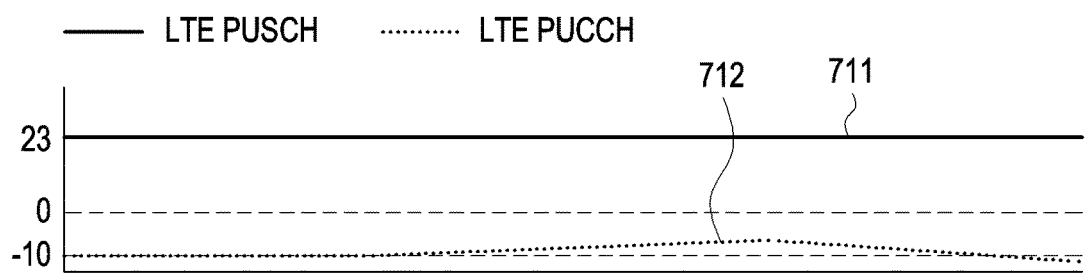
FIG. 7B is a diagram illustrating transmission power of a physical shared channel (PUSCH) and a physical control channel (PUCCH) of LTE communication and an SRS transmission power of NR communication according to various embodiments.
Figure 7B:
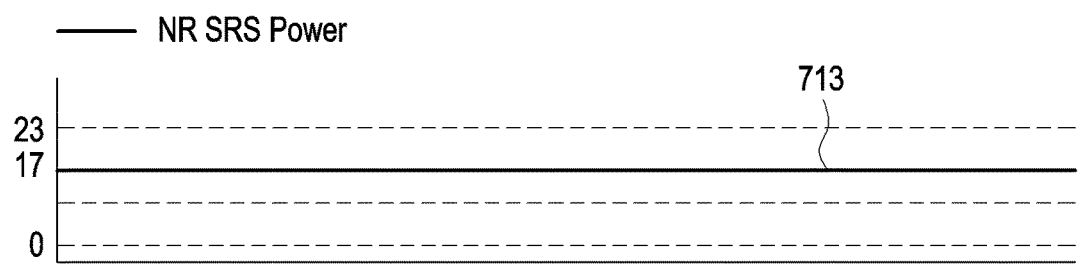

FIG. 7B is a diagram illustrating transmission power of a physical shared channel (PUSCH) and a physical control channel (PUCCH) of LTE communication and an SRS transmission power of NR communication according to various embodiments.

According to various embodiments, when located in a strong electric field, the electronic device 101 (e.g., at least one of the processor 120, the first communication processor 212, the second communication processor 214, or the integrated communication processor 260) may configure a transmission power 712 of PUCCH of LTE communication having a relatively low magnitude (e.g., −10 dBm). The electronic device 101 may configure the transmission power 712 of PUCCH of LTE communication with respect to subframe (i) according to, for example, Equation 1.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}$$  [Equation 1]

$P_{CMAX}$ is a maximum output power according to a power class of the electronic device 101. $P_{O\_PUCCH}$ is the sum of $P_{O\_NOMINAL\_PUCCH}$ (parameter specified by a cell) and $P_{O\_UE\_PUCCH}$ (parameter specified by the electronic device 101). PL is a downlink path-loss measured by the electronic device 101. $h(n_{CQI}, n_{HARQ})$ is a value according to a PUCCH format (PUCCH format), where $n_{CQI}$ is an amount of information according to a channel quality indicator (CQI), and $n_{HARQ}$ is the number of hybrid automatic repeat request (HARQ) bits. $\Delta_{F\_PUCCH}(F)$ is a value for PUCCH transport format F and is given to the electronic device 101 by RRC. g(i) is a value adjustable by downlink control information (DCI) from a base station. At least some of the parameters for Equation 1 may comply with, for example, 3GPP TS 36.213. The electronic device 101 may configure a smaller value between $P_{CMAX}$ and the sum of $P_{O\_UE\_PUCCH}$, PL, $h(n_{CQI}, n_{HARQ})$, $\Delta_{F\_PUCCH}(F)$, and g(i) to be the transmission power 712 of PUCCH of LTE communication. In a situation where the electronic device 101 is located in a strong electric field, the transmit power 712 of PUCCH of LTE communication may maintain a relatively low value (e.g., −10 dBm in FIG. 7B).

The electronic device 101 according to various embodiments may configure a transmission power 711 of PUSCH of LTE communication for subframe (i) according to Equation 2.

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \text{ [dBm]}$$  [Equation 2]

$P_{CMAX}$ is a maximum output power according to a power class of the electronic device 101. $M_{PUSCH}(i)$ is the number of resource blocks allocated to the electronic device 101. $P_{O\_PUSCH}(j)$ is the sum of $P_{O\_NOMINAL\_PUSCH}(j)$ (parameter specified by a cell) and $P_{O\_UE\_PUSCH}(j)$ (parameter specified by the electronic device 101). PL is a downlink path-loss measured by the electronic device 101. A scaling factor of $(\alpha(j))$ may be determined in a higher layer in consideration of a path-loss mismatch between an uplink channel and a downlink channel $\Delta_{TF}(i)$ is a modulation-and-coding scheme (MCS) compensation parameter or a transport format (TF) compensation parameter. f(i) is a value adjusted by downlink control information (DCI) from the base station after an initial configuration. The electronic device 101 may configure a smaller value between $P_{CMAX}$ and the sum of $M_{PUSCH}(i)$, $P_{O\_PUSCH}(j)$, product of scaling factor $(\alpha(j))$ and PL, $\Delta_{TF}(i)$, and f(i) to be the transmission power 711 of PUSCH of LTE communication. At least some of the parameters for Equation 2 may comply with, for example, 3GPP TS 36.213. Even in a situation where the electronic device 101 is located in a strong electric field, if the number $(M_{PUSCH}(i))$ of resource blocks allocated to the electronic device 101 is relatively large, the transmission power 711 of PUSCH of LTE communication may maintain a relatively high value (e.g., 23 dBm in FIG. 7B).

When ENDC is used, in response to the transmission power 711 (e.g., 23 dBm) of PUSCH of LTE communication, a maximum output power value ($P_{max\_NR\_DPS}$) (e.g., 17 dBm) of NR communication according to DPS may be configured. The electronic device 101 may transmit an SRS having a transmission power less than the maximum output power value ($P_{max\_NR\_DPS}$) of NR communication according to DPS. As shown in FIG. 7B, an SRS transmit power 713 may be 17 dBm. The electronic device 101 may configure an SRS output power on the basis of, for example, Equation 3. The SRS output power may be, for example, a value defined in an antenna connector, but there is no limitation on a point thereof. The SRS output power may be referred to as an SRS target power and is a transmission power based on 3GPP TS 38.213, and the term is not limited.

$$P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i,l)$$  [Equation 3]

$P_{O\_SRS,b,f,c(qs)}$ may be provided by p0 for an activation uplink bandwidth part (UL BWP) (b) of a carrier (f) of a serving cell (c) and an SRS resource set (qs) provided by SRS-ResourceSetID and SRS-ResourceSet according to an SRS configuration, and may be included, for example, SIB2. $M_{SRS,b,f,c}(i)$ is an SRS bandwidth represented by numbers of resource blocks for SRS transmission occasion (i) on the activation UL BWP(b) of the carrier (f) of the serving cell (c), and μ is SCS. $\alpha_{SRS,b,f,c(qs)}$ is provided by alpha for the activation UL BWP of the carrier (f) of the serving cell (c) and the SRS resource set (qs), and represents a reflection ratio of a path-loss. $PL_{b,f,c}(q_d)$ is a downlink path-loss predicted by a user equipment (UE) according to dB units using an RS resource index (qd), with respect to an activation downlink BWP (DL BWP) of the serving cell (c) and the SRS resource set (qs). $PL_{b,f,c}(q_d)$ may be calculated, for example, based on a measurement result for a reference signal from the base station. $h_{b,f,c}(i)$ is a value adjustable by downlink control information (DCI) from the base station. At least some of the parameters for Equation 3 may comply with, for example, 3GPP TS 38.213.

According to various embodiments, the electronic device 101 may configure, for example, a smaller value between an SRS output power according to Equation 3 and a maximum output power value ($P_{max\_NR\_DPS}$) of NR communication according to DPS to be the SRS transmission power 713. For example, if the maximum output power value ($P_{max\_NR\_DPS}$) of NR communication is configured to 17 dBm, even if the SRS output power is configured to 17 dBm or greater, the electronic device 101 should transmit the SRS with a transmission power of 17 dBm or less. As the difference between the SRS output power and the maximum output power (e.g., maximum output power of NR communication according to DPS) increases, a downlink throughput may decrease. Table 2 is an example of measurement results according to the difference between the SRS output power and the maximum output power.

TABLE 2

| SRS Output Power-Maximum Output Power | Downlink Throughput (Mbps) | RB ratio (%) | Grant Ratio (%) Maximum Value: 80 | Downlink BLER (%) | Effective Spectral Efficiency |
|---|---|---|---|---|---|
| 0 dB | 985.7 | 97 | 75.5 | 9.4 | 26.1 |
| 2 dB | 948 | 97 | 77.1 | 12.1 | 23.7 |
| 4 dB | 906.9 | 97 | 75.3 | 12.3 | 24.2 |

TABLE 2-continued

| SRS Output Power- Maximum Output Power | Downlink Throughput (Mbps) | RB ratio (%) | Grant Ratio (%) Maximum Value: 80 | Downlink BLER (%) | Effective Spectral Efficiency |
|---|---|---|---|---|---|
| 6 dB | 848.7 | 96 | 74.4 | 13.9 | 23 |
| 8 dB | 837.5 | 96 | 72.7 | 13.4 | 23.3 |
| 10 dB | 790 | 97 | 74.6 | 13.9 | 20.7 |

For example, if the SRS output power is 25 dBm and the maximum output power is 19 dBm, the difference therebetween is 6 dB, and in this case, a downlink throughput of 848.7 Mbps, an RB ratio of 96%, a grant ratio of 74.4%, a downlink BLER of 13.9, and an effective spectral efficiency of 23 may be measured. If the electronic device 101 is located in a relatively weak electric field, the difference between the SRS output power and the maximum output power may be relatively large, and if the electronic device 101 is located in a relatively strong electric field, the difference between the SRS output power and the maximum output power may be relatively small. As identified in Table 2, it may be identified that, as the difference between the SRS output power and the maximum output power increases, the downlink throughput decreases, the RB ratio decreases, the grant ratio decreases, and the downlink BLER increases. However, in an actual measurement environment, there may be a variable (e.g., time and/or frequency resource allocation) that occurs while multiple users operate with a corresponding base station, and a value obtained by excluding influence of the variable may be an effective spectral efficiency. The effective spectral efficiency may be a downlink throughput obtained when a fixed time and/or frequency resource have been allocated to the electronic device 101. It may be identified that the effective spectral efficiency decreases as the difference between the SRS output power and the maximum output power increases. For example, SRS switching performance gain values based on a case where the SRS output power is not limited (when the difference between the SRS output power and the maximum output power is 0) may be as shown in Table 3. The gain values may be calculated based on (effective spectral efficiency−26.1)/26.1*100.

TABLE 3

| Difference between SRS output power and maximum output power (dB) | 2 | 4 | 6 | 8 | 10 |
|---|---|---|---|---|---|
| Gain value | −9% | −7% | −11% | −10% | −20% |

As described above, even when the electronic device 101 is located in a strong electric field, if RB allocation to PUSCH of LTE communication has a value relatively large, the LTE PUSCH transmission power 712 may be configured to be relatively high. The LTE PUSCH transmission power 712 is used for data transmission via PUSCH, and may be interchangeably used with an LTE transmission power. According to DPS limitation, the NR SRS transmission power 713 may be configured to be relatively low, and the NR downlink throughput may be reduced. The electronic device 101 according to various embodiments may increase the NR SRS transmission power 713 by temporarily adjusting the LTE PUSCH transmission power 712, thereby increasing the NR downlink throughput.

Figure 8A:
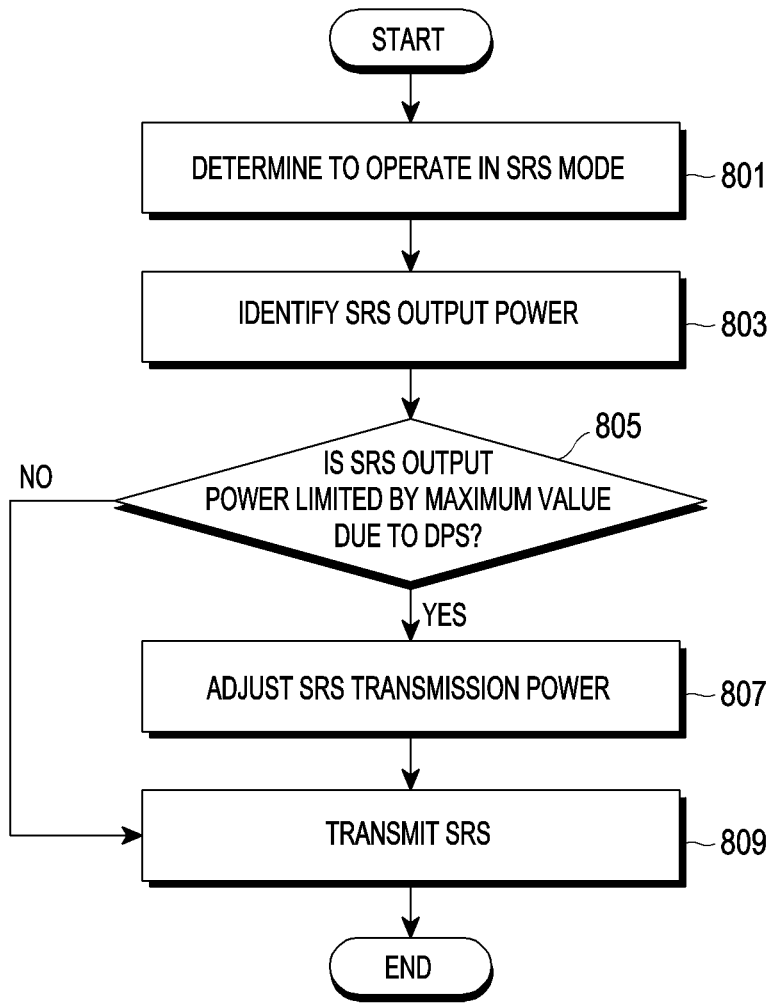
FIG. 8A is a flowchart illustrating an example method of operating the electronic device according to various embodiments.
Figure 8B:
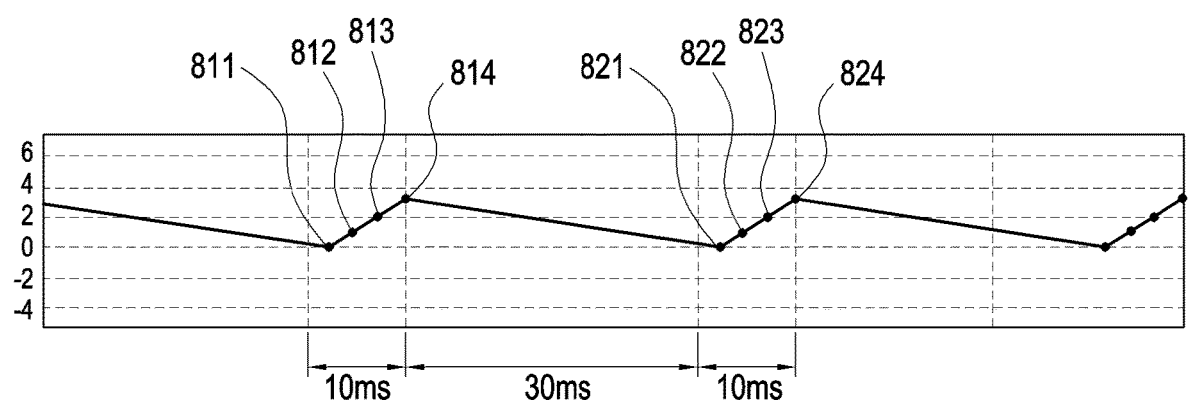
FIG. 8B is a diagram illustrating an SRS transmission period according to various embodiments.

FIG. 8A is a flowchart illustrating an example method of operating the electronic device according to various embodiments. The embodiment of FIG. 8A will be described with reference to FIG. 8B. FIG. 8B is a diagram illustrating an SRS transmission period according to various embodiments.

According to various embodiments, the electronic device 101 (e.g., at least one of the processor 120, the first communication processor 212, the second communication processor 214, or the integrated communication processor 260) may determine to operate in an SRS mode in operation 801. An SRS configuration that the electronic device 101 receives from the network may include, for example, an SRS resource field and an SRS set field. The SRS resource field may be mapped to each antenna so as to be applied when an SRS is transmitted using a corresponding antenna. The SRS set field may specify that each SRS resource is configured as a set and the corresponding resource is used for SRS antenna switching. In the SRS resource field, an SRS transmission period may be configured and may be configured to, for example, one of 80 ms, 40 ms, 20 ms, and 10 ms. If there is no significant gain in a downlink throughput, the SRS transmission period may be maintained at a relatively high value (e.g., 80 ms). If a gain occurs in the downlink throughput, the network may reduce the period of the SRS. The electronic device 101 may determine whether to operate in the SRS mode, based on, for example, at least one of the SRS period and/or downlink throughput. For example, the electronic device 101 may operate in the SRS mode, based on the SRS period being less than or equal to a threshold period and/or the downlink throughput being greater than or equal to a threshold throughput. Referring to FIG. 8B, the electronic device 101 may configure the SRS period to 40 ms according to the SRS configuration. For example, the electronic device 101 may transmit SRSs 811, 812, 813, and 814 for 10 ms (e.g., 20 slots), transmit no SRS for 30 ms, and transmit SRSs 821, 822, 823, and 824 for 10 ms again. The electronic device 101 may operate in the SRS mode, based on that the period of the SRS is 40 ms, which is less than or equal to the threshold period (e.g., 40 ms). However, this is an example, and the electronic device 101 may be configured to operate in the SRS mode when the SRS configuration is identified.

According to various embodiments, the electronic device 101 may identify an SRS output power in operation 803. For example, the electronic device 101 may identify the SRS output power on the basis of Equation 3. In operation 805, the electronic device 101 may determine whether the SRS output power is limited by a maximum output power value due to DPS. For example, the electronic device 101 may identify the maximum output power value of NR communication according to DPS, which corresponds to an output power of current LTE communication. If the electronic device 101 stores power values according to DPS as shown in Table 1, if the output power of LTE communication is 23 dBm, the maximum output power value of NR communication according to DPS may be identified to be 17 dBm. The electronic device 101 may determine whether the SRS output power is limited by the maximum output power value of NR communication, by determining whether the SRS output power is greater than the maximum output power value of NR communication.

According to various embodiments, if the SRS output power is limited by the maximum output power value of NR communication (Yes in 805), the electronic device 101 may adjust, in operation 807, the SRS transmission power to be equal to or less than the maximum output power value of NR communication. In operation 809, the electronic device 101 may transmit the SRS with the adjusted SRS transmission power. If the SRS output power is not limited by the maximum output power value of NR communication (No in 805), the electronic device 101 may transmit, in operation 809, the SRS without adjusting the SRS output power. In this case, if the maximum output power value of NR communication is relatively small, the SRS transmission power may be configured to be less, and the downlink throughput may be reduced. Accordingly, the electronic device 101 may configure the SRS transmission power to be relatively large by increasing the maximum output power value of NR communication, and this will be described with reference to FIG. 9.

Figure 9:
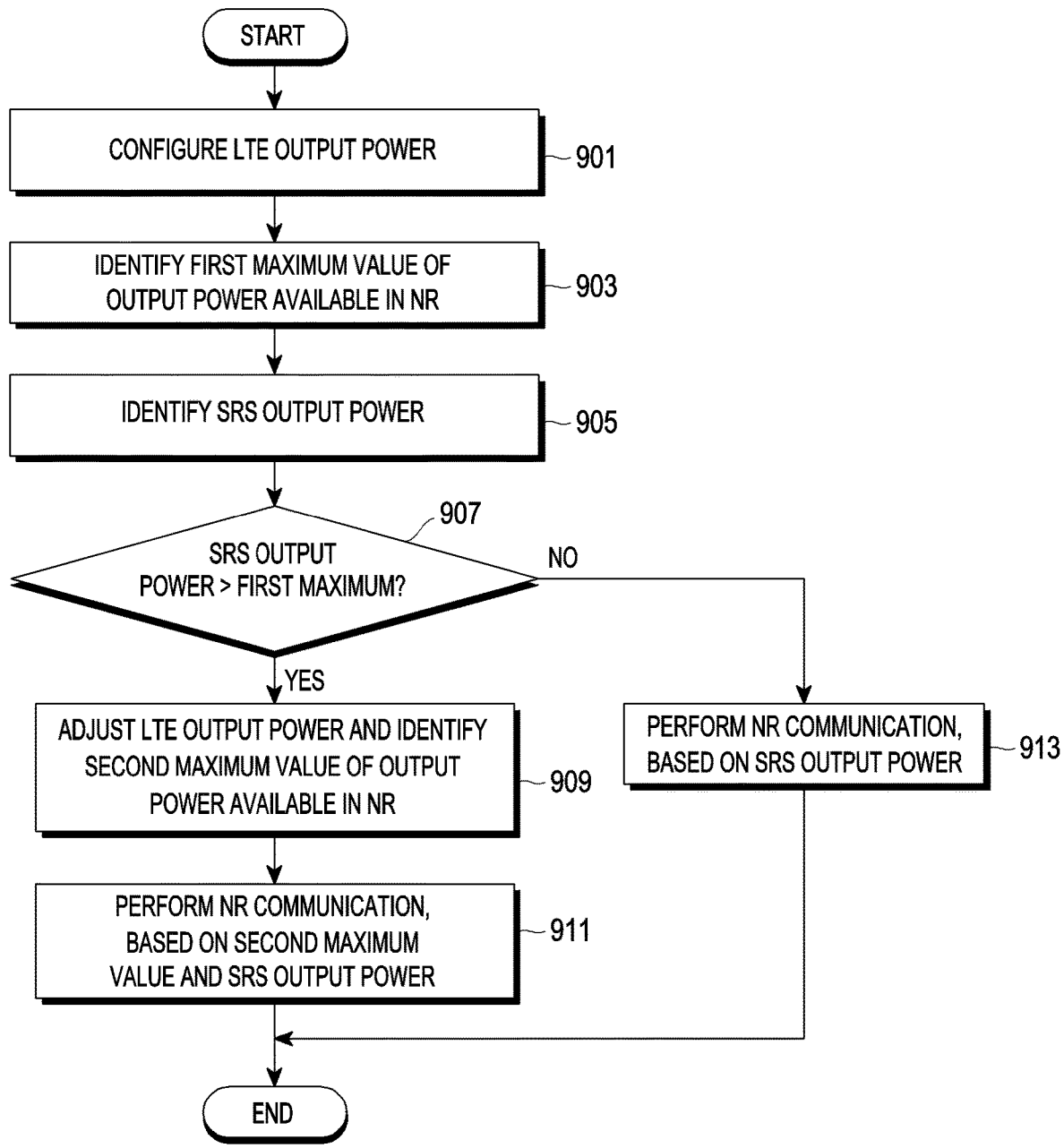
FIG. 9 is a flowchart illustrating an example method of operating the electronic device according to various embodiments.
Figure 10A:
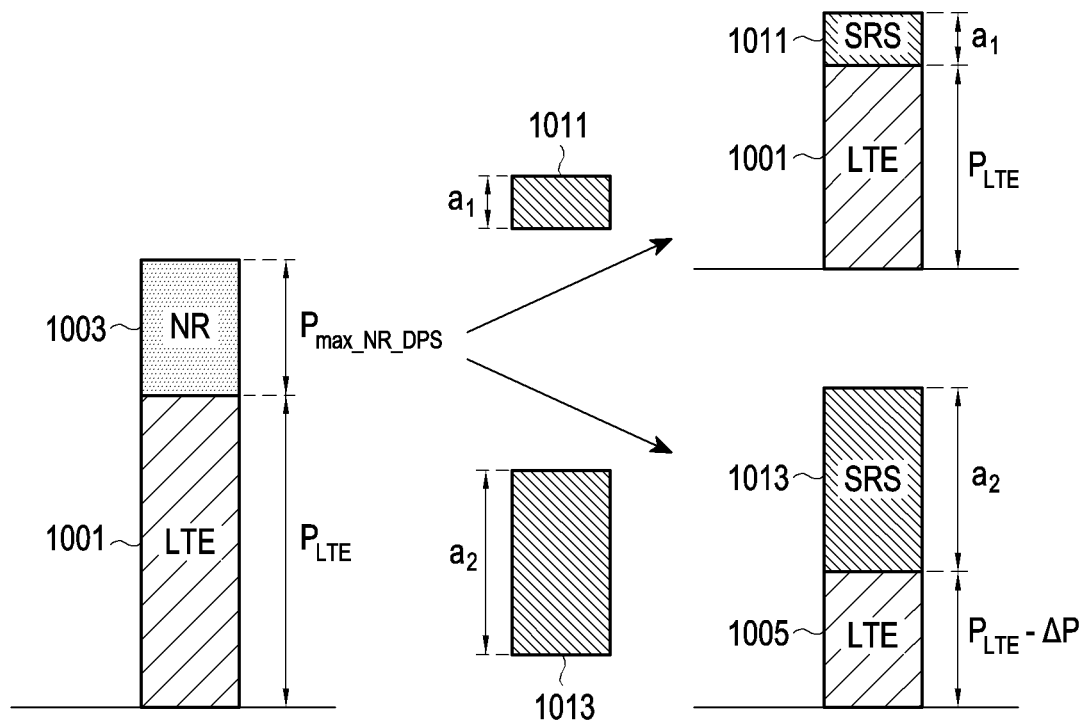
FIG. 10A is a diagram illustrating a PUSCH transmission power of LTE communication and an SRS transmission power of NR communication according to various embodiments.

FIG. 9 is a flowchart illustrating an example method of operating the electronic device according to various embodiments. The embodiment of FIG. 9 will be described with reference to FIG. 10A. FIG. 10A is a diagram illustrating a PUSCH transmission power of LTE communication and an SRS transmission power of NR communication according to various embodiments.

According to various embodiments, the electronic device 101 (e.g., at least one of the processor 120, the first communication processor 212, the second communication processor 214, or the integrated communication processor 260) may configure an output power of LTE communication in operation 901. For example, the electronic device 101 may configure a PUSCH transmission power of LTE communication. The electronic device 101 may configure the PUSCH transmission power of LTE communication according to, for example, Equation 2, but there is no limitation. In operation 903, the electronic device 101 may identify a first maximum value of an output power available in NR, which corresponds to the configured value. For example, the electronic device 101 may identify the first maximum value of the output power available in NR, which corresponds to the configured value, based on association information between power values as shown in Table 1. For example, referring to FIG. 10A, the electronic device 101 may configure a PUSCH transmission power ($P_{LTE}$) 1001 of LTE communication. The electronic device 101 may identify a maximum output power ($P_{max\_NR\_DPS}$) 1003 of NR communication according to DPS, which corresponds to the PUSCH transmission power ($P_{LTE}$) 1001 of LTE communication.

According to various embodiments, the electronic device 101 may identify an SRS output power in operation 905. For example, the electronic device 101 may determine the SRS output power on the basis of Equation 3. In operation 907, the electronic device 101 may determine whether the SRS output power is greater than the first maximum value of the output power available in NR. If the SRS output power is greater than the first maximum value of the output power available in NR (Yes in 907), the electronic device 101 may adjust the output power of LTE communication and identify a second maximum value of the output power available in NR, which corresponds to the adjusted value, in operation 909. For example, the electronic device 101 may back-off the output power of LTE communication, and accordingly, the maximum value of the output power available in NR may increase. In operation 911, the electronic device 101 may transmit an SRS, based on the second maximum value and the SRS output power. For example, the electronic device 101 may transmit the SRS with a smaller value between the second maximum value and the SRS output power. If the SRS output power is not greater than the maximum value of the output power available in NR (No in 907), the electronic device 101 may transmit the SRS on the basis of the SRS output power without adjusting the output power of LTE communication, in operation 913.

Referring to FIG. 10A, for example, the electronic device 101 may identify a first SRS output power 1011 on the basis of Equation 3. The electronic device 101 may determine that magnitude a1 of the first SRS output power 1011 is less than the maximum output power ($P_{max\_NR\_DPS}$) 1003 of NR communication according to DPS. In this case, the electronic device 101 may transmit the SRS with the first SRS output power 1011. The PUSCH transmission power ($P_{LTE}$) 1001 and the first SRS output power 1011 of LTE communication may be equal to or less than the maximum output power. For example, the electronic device 101 may identify a second SRS output power 1013 on the basis of Equation 3. The electronic device 101 may determine that magnitude a2 of the second SRS output power 1013 is greater than the maximum output power ($P_{max\_NR\_DPS}$) 1003 of NR communication according to DPS. In this case, the electronic device 101 may configure an adjusted PUSCH transmission power ($P_{LTE}$) 1005 of LTE communication by backing off the PUSCH transmission power ($P_{LTE}$) 1001 of LTE communication by ΔP. The electronic device 101 may transmit the SRS with the second SRS output power 1013. The adjusted PUSCH transmission power ($P_{LTE}$) 1005 and the second SRS output power 1013 of LTE communication may be equal to or less than the maximum output power. Accordingly, the electronic device 101 may transmit an SRS with a sufficient magnitude, and a downlink throughput may be thus improved.

According to various embodiments, the electronic device 101 may determine the back-off amount of the PUSCH transmission power of LTE communication, based on association information (e.g., association information indicating that, when $P_{max\_NR\_SRS}$ is x, $P_{LTE}$ is y, and in this case, $P_{LTE\_Backoff}$ is z) in Table 4. Table 4 shows back-off amounts (ΔP) when the output power ($P_{LTE}$) of the current LTE communication is configured to 23 dBm.

TABLE 4

| $P_{max\_NR\_SRS}$ (dBm) | 23 | 22 | 21 | 20 | 19 | 18 | 17 |
|---|---|---|---|---|---|---|---|
| $P_{LTE}$ (dBm) | 17 | 18 | 19 | 20 | 21 | 22 | 23 |
| $P_{LTE\_Backoff}$ (dBm) | 6 | 5 | 4 | 3 | 2 | 1 | 0 |

For example, the electronic device 101 may determine that an SRS target value is 23 dBm and is limited by the maximum output power ($P_{max\_NR\_DPS}$) of NR communication according to DPS. The electronic device 101 may configure the maximum transmission power ($P_{max\_NR\_SRS}$) for the SRS to 23 dBm that is the SRS target value. In Table 4, the output power ($P_{LTE}$) of LTE communication may be configured for each maximum transmission power ($P_{max\_NR\_SRS}$) for the SRS. The pair of the maximum transmission power ($P_{max\_NR\_SRS}$) for SRS and the output power ($P_{LTE}$) of LTE communication in Table 4 may have, for example, the same value as that of the pair of the output power ($P_{LTE}$) of LTE communication and the maximum output power ($P_{max\_NR\_DPS}$) of NR communication according to DPS in Table 1. The electronic device 101 may adjust the output power ($P_{LTE}$) of LTE communication from 23 dBm to 17 dBm, based on that the back-off amount of the LTE communication ($P_{LTE}$) is 6 dBm. Accordingly, even if the electronic device 101 transmits the SRS at 23 dBm, the sum may be within the maximum output power. For example, the electronic device 101 may back-off the PUSCH transmission power of LTE communication by reducing a limit of the PUSCH transmission power of LTE communication, but there is no limitation in a method of reducing the transmission power. In various embodiments, the electronic device 101 may configure a limit for a back-off of the PUSCH transmission power of LTE communication. For example, the electronic device 101 may be configured not to back-off 3 dB or more.

Figure 10B:
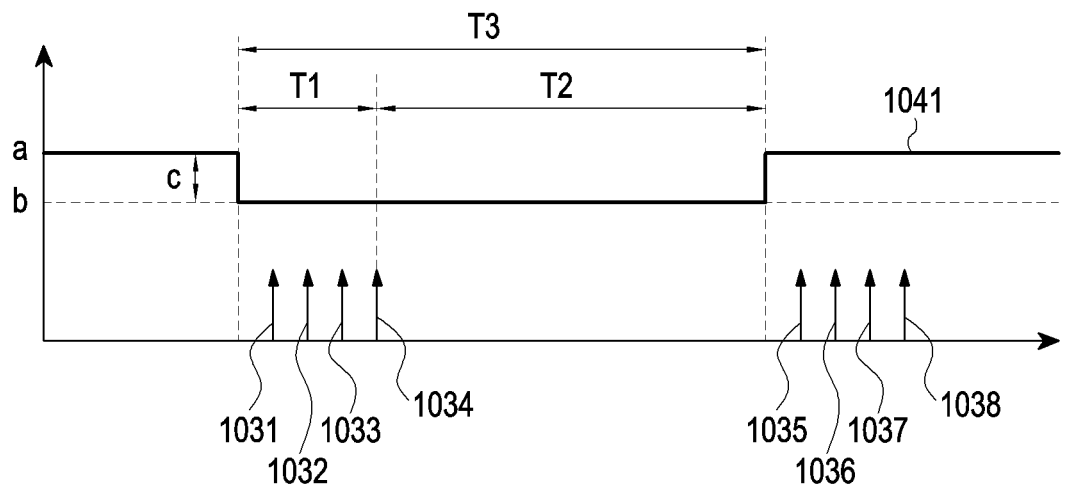
FIGS. 10B, 10C and 10D are diagrams illustrating a back-off period according to various embodiments.

FIG. 10B is a diagram illustrating a back-off period of PUSCH of LTE communication according to various embodiments.

According to various embodiments, the electronic device 101 may be configured to transmit an SRS in SRS transmission period T3. For example, the electronic device 101 may transmit SRS signals 1031, 1032, 1033, and 1034 during period T1 and may not transmit an SRS signal during period T2. For example, the SRS signals 1031, 1032, 1033, and 1034 may be transmitted through four antennas (e.g., antennas 411, 412, 413, and 414 of FIG. 4), respectively. The electronic device 101 may configure a PUSCH transmission power 1041 of LTE communication to a. Although not illustrated, in response to the PUSCH transmission power 1041 of LTE communication, the maximum output power ($P_{max\_NR\_DPS}$) of NR communication according to DPS may be configured to d. The electronic device 101 may determine that SRS output powers corresponding to at least some of the SRS signals 1031, 1032, 1033, and 1034 are greater than the maximum output power ($P_{max\_NR\_DPS}$) (e.g., d) of NR communication according to DPS. In an example, the SRS output powers corresponding to the SRS signals 1031, 1032, 1033, and 1034 may be the same. In another example, the SRS output powers corresponding to the SRS signals 1031, 1032, 1033, and 1034 may be different. The electronic device 101 may determine to back-off the PUSCH transmission power 1041 of LTE communication by c, based on that the SRS output powers corresponding to at least some of the SRS signals 1031, 1032, 1033, and 1034 are greater than the maximum output power ($P_{max\_NR\_DPS}$) (e.g., d) of NR communication. In an example, the electronic device 101 may apply the PUSCH transmission power 1041 of LTE communication of backed-off (e.g., reduced) b during one SRS transmission period T3. After SRS transmission period T3, the electronic device 101 may restore the PUSCH transmission power 1041 of LTE communication to original magnitude a. For example, if it is determined that SRS output powers for SRSs 1035, 1036, 1037, and 1038 are not limited by DPS, the electronic device 101 may restore the PUSCH transmission power 1041 of LTE communication. If it is determined that the SRS output powers for the SRSs 1035, 1036, 1037, and 1038 are limited by DPS, the electronic device 101 may continuously maintain, as b, the back-off of the PUSCH transmission power 1041 of LTE communication.

Figure 10C:
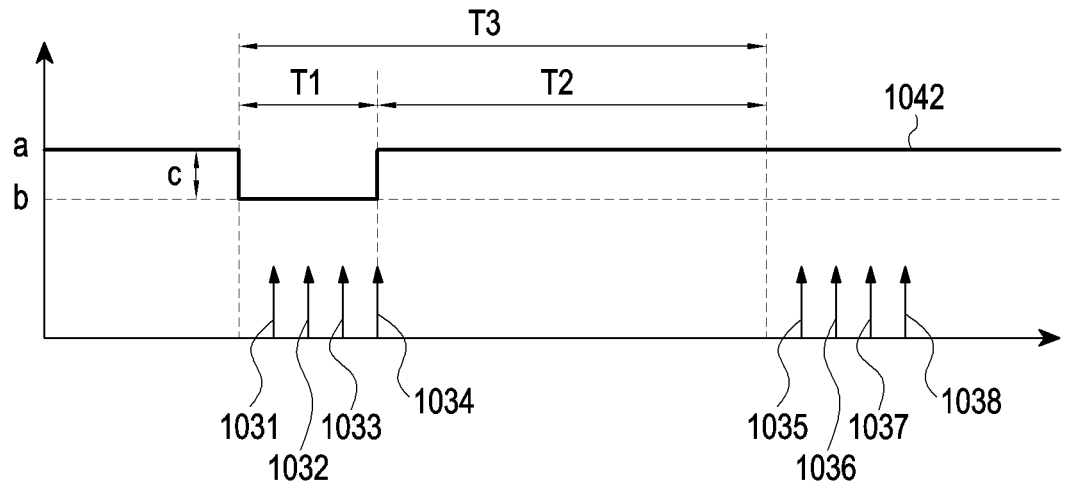

FIG. 10C is a diagram illustrating an example back-off period according to various embodiments.

The electronic device 101 according to various embodiments may back-off a PUSCH transmission power 1042 of LTE communication during period T1 in the entire SRS transmission period T3. Thereafter, the electronic device 101 may restore the PUSCH transmission power 1042 of LTE communication to an original magnitude, and accordingly, during period T2, the PUSCH transmission power 1042 of LTE communication may be configured to a. For example, if it is determined that SRS output powers for the SRSs 1035, 1036, 1037, and 1038 are not limited by DPS, the electronic device 101 may maintain the PUSCH transmission power 1041 of LTE communication to the original magnitude (e.g., a). If it is determined that the SRS output powers for the SRSs 1035, 1036, 1037, and 1038 are limited by DPS, the electronic device 101 may back-off the PUSCH transmission power 1042 of LTE communication to b while the SRSs 1035, 1036, 1037, and 1038 are transmitted.

Figure 10D:
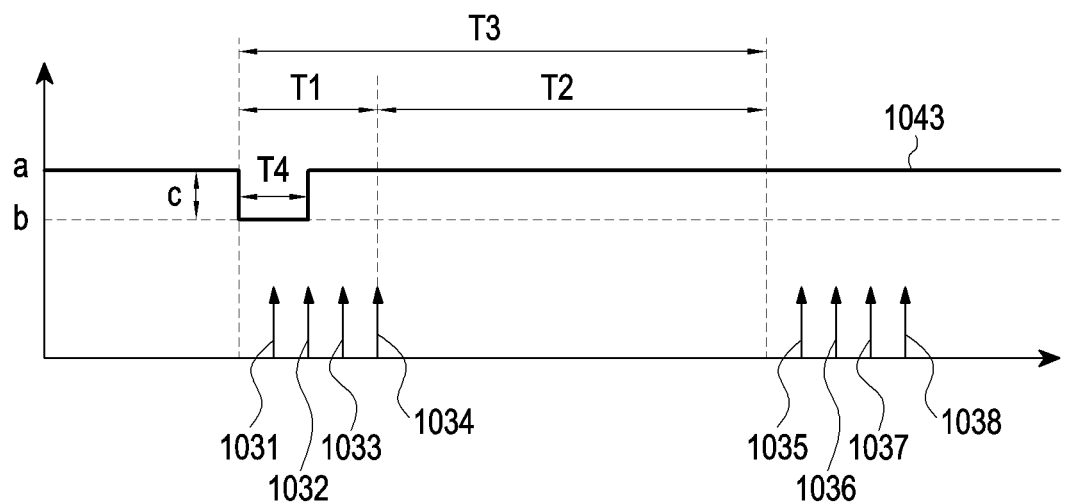

FIG. 10D is a diagram illustrating an example back-off period according to various embodiments.

Referring to FIG. 10D, the electronic device 101 according to various embodiments may back-off a PUSCH transmission power 1043 of LTE communication during SRS transmission period T4, in which SRS output power are limited, in the entire SRS transmission period T3. For example, it may be identified that the SRS output powers corresponding to the SRSs 1031 and 1032 are limited by DPS, and the SRS output powers corresponding to the remaining SRSs 1033, 1034, 1035, 1036, 1037, and 1038 are not limited by DPS. For example, the SRS output powers for the respective SRSs 1031, 1032, 1033, and 1034 may be different. The electronic device 101 may back-off, by c, the PUSCH transmission power 1043 of LTE communication during transmission period T4 of the SRS 1031, in which the SRS output power is limited, and may configure the PUSCH transmission power 1043 of LTE communication to be an original magnitude (e.g., a) during the remaining periods.

It has been described in FIG. 9 that PUSCH of LTE communication is adjusted in order to increase an SRS transmission power of NR communication in ENDC, but this is merely an example, and those skilled in the art will understand that NR and LTE of FIG. 9 are interchanged with each other in NEDC. In addition, those skilled in the art will understand that various embodiments may be applied not only to LTE and NR, but also to MR-DC based on various RATs.

Figure 11:
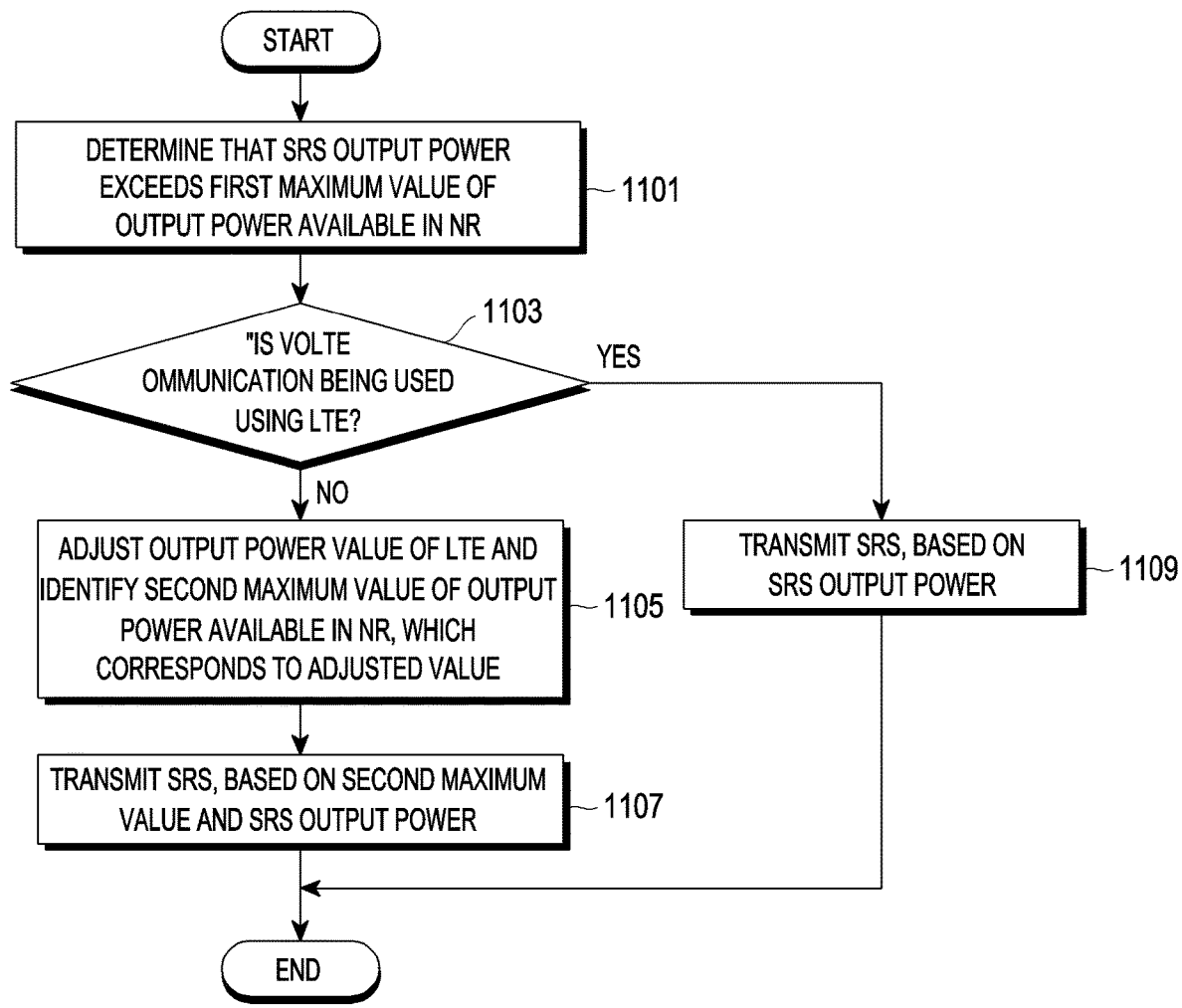
FIG. 11 is a flowchart illustrating an example method of operating the electronic device according to various embodiments.

FIG. 11 is a flowchart illustrating an example method of operating the electronic device according to various embodiments.

According to various embodiments, the electronic device 101 (e.g., at least one of the processor 120, the first communication processor 212, the second communication processor 214, or the integrated communication processor 260) may determine, in operation 1101, that an SRS output power exceeds a first maximum value of an output power available in NR. In operation 1103, the electronic device 101 may determine whether VoLTE communication is being used using LTE. If VoLTE communication is not in use (No in 1103), the electronic device 101 may adjust an output power value of LTE communication and identify a second maximum value of an output power available in NR, which corresponds to the adjusted value, in operation 1105. In operation 1107, the electronic device 101 may transmit an SRS, based on the second maximum value and the SRS output power. When VoLTE is being performed, real-time packet transmission is required, and the electronic device 101 may be thus configured not to back-off a PUSCH transmission power of LTE communication. When VoLTE communication is being used (Yes in 1103), the electronic device 101 may transmit an SRS in operation 1109 on the basis of the SRS output power without a back-off for the output power of LTE communication.

Figure 12:
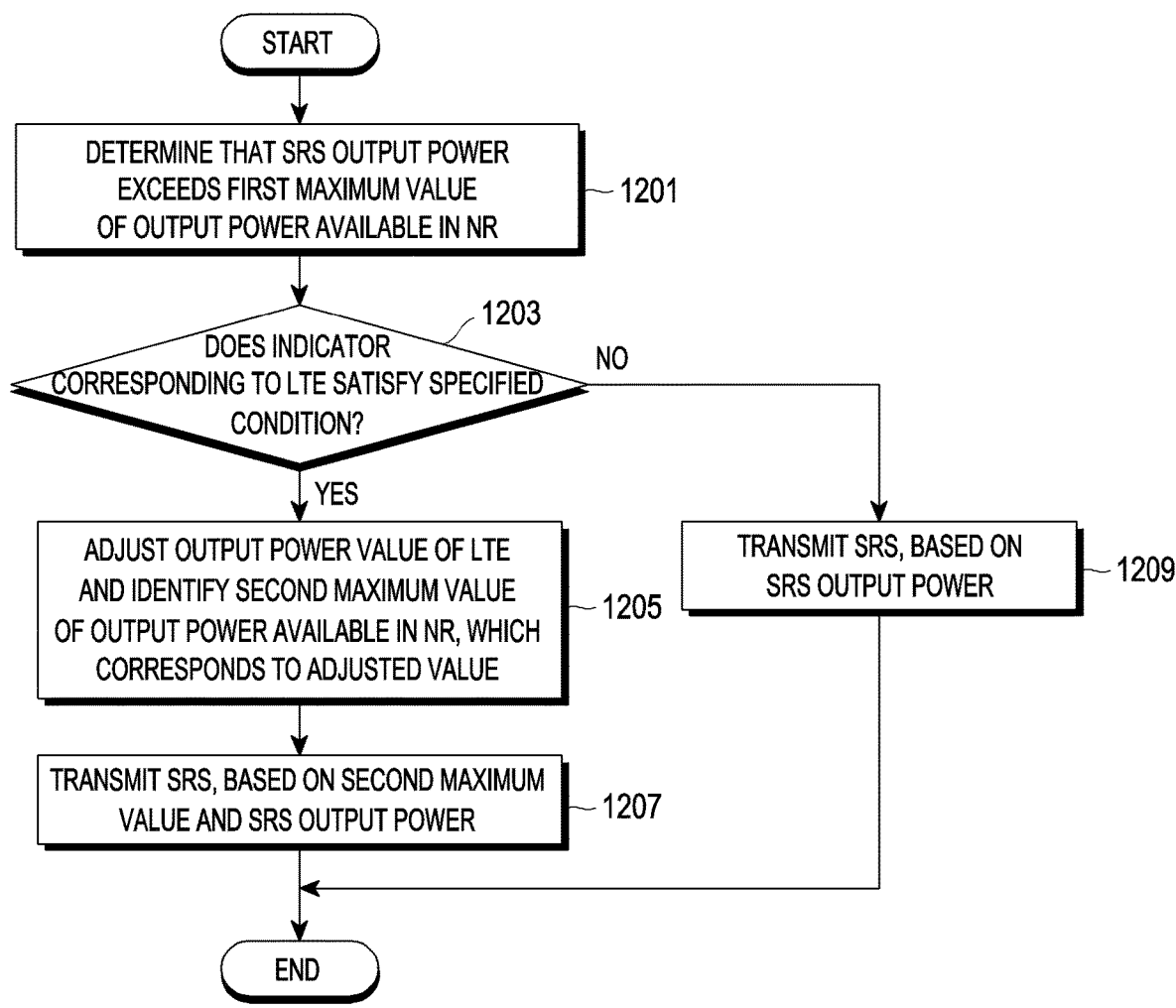
FIG. 12 is a flowchart illustrating an example method of operating the electronic device according to various embodiments.

FIG. 12 is a flowchart illustrating an example method of operating the electronic device according to various embodiments.

According to various embodiments, the electronic device 101 (e.g., at least one of the processor 120, the first communication processor 212, the second communication processor 214, or the integrated communication processor 260) may determine, in operation 1201, that an SRS output power exceeds a first maximum value of an output power available in NR. In operation 1203, the electronic device 101 may determine whether an indicator corresponding to LTE communication satisfies a specified condition. Here, the specified condition may be, for example, a block error rate corresponding to LTE communication, which is equal to or higher than a threshold rate, and may be a condition for determining that a communication quality of LTE communication is good. Those skilled in the art will understand that there is no limitation as long as the indicator indicates a communication quality. If the indicator corresponding to LTE communication satisfies the specified condition (Yes in 1203), the electronic device 101 may adjust an output power value of LTE communication and identify a second maximum value of an output power available in NR, which corresponds to the adjusted value, in operation 1205. In operation 1207, the electronic device 101 may transmit an SRS, based on the second maximum value and the SRS output power. If the communication quality of LTE communication is good, even if the output power value of the LTE communication is backed-off, the communication quality may be maintained at a specific level, so that the electronic device 101 may perform a back-off. However, if the communication quality of LTE communication is poor, when the output power value of LTE communication is backed-off, the communication quality is further deteriorated, so that the electronic device 101 may be configured not to perform a back-off. If the indicator corresponding to LTE communication does not satisfy the specified condition (No in 1203), the electronic device 101 may transmit the SRS in operation 1109 on the basis of the SRS output power without a back-off for the output power of LTE communication.

Figure 13:
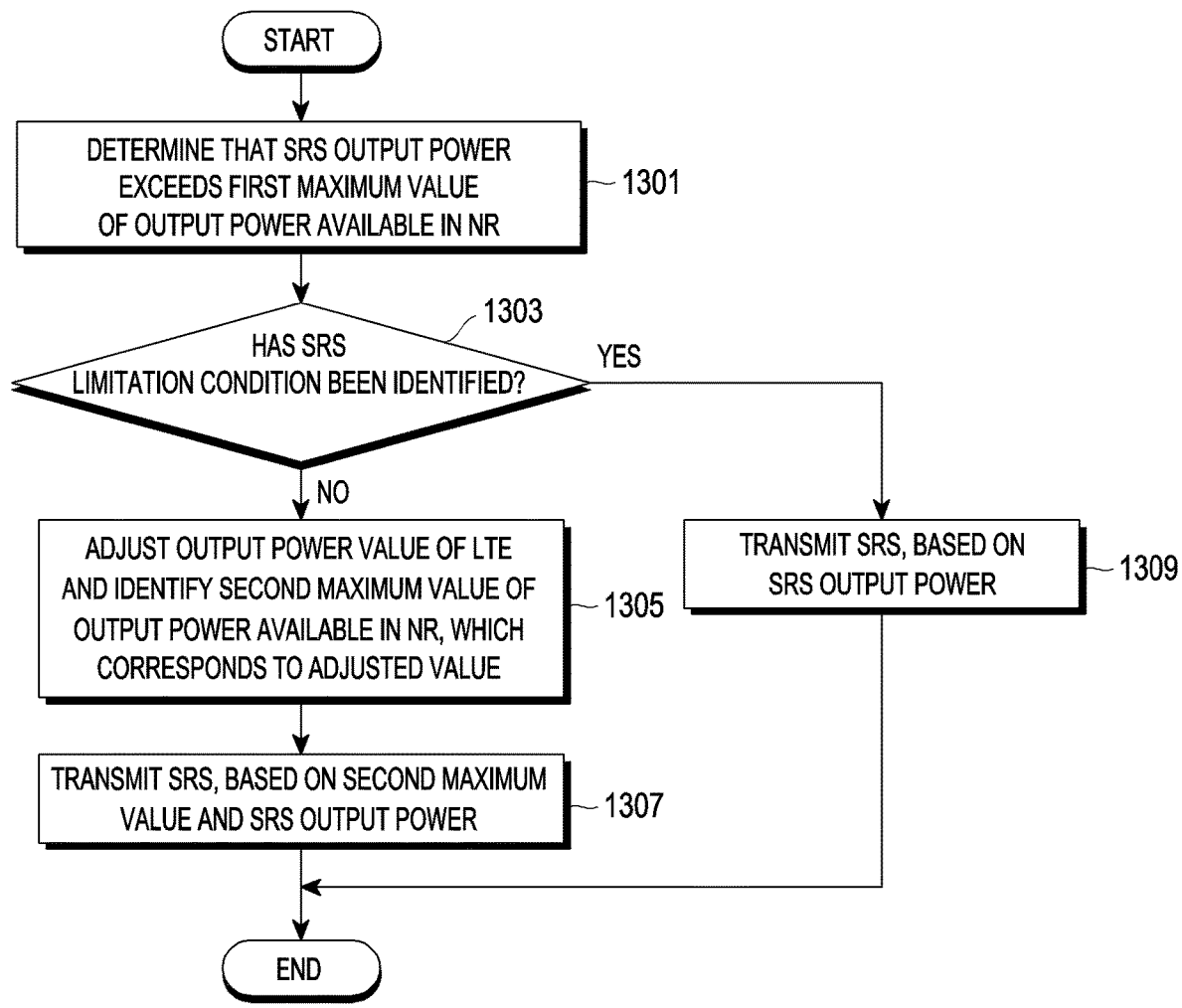
FIG. 13 is a flowchart illustrating an example method of operating the electronic device according to various embodiments.

FIG. 13 is a flowchart illustrating an example method of operating the electronic device according to various embodiments.

According to various embodiments, the electronic device 101 (e.g., at least one of the processor 120, the first communication processor 212, the second communication processor 214, or the integrated communication processor 260) may determine, in operation 1301, that an SRS output power exceeds a first maximum value of an output power available in NR. In operation 1303, the electronic device 101 may determine whether an SRS limitation condition is identified. The SRS limitation condition may be at least one of various conditions enabling determination of a case in which a downlink throughput in a case of transmitting an SRS does not increase significantly compared to a downlink throughput in a case of transmitting no SRS. A degree of increase in the downlink throughput in the case of transmitting an SRS, compared to the downlink throughput in the case of transmitting no SRS may be referred to as a gain of the downlink throughput. A downlink throughput is merely an example parameter, and those skilled in the art will understand that any parameter capable of indicating the speed and/or quality of downlink may be used in place of a downlink throughput. As one example, if a size of downlink data is relatively small, a gain of a downlink throughput may not be large. In consideration of a tradeoff between current consumption and a gain of a downlink throughput, if the size of (e.g., physical downlink shared channel (PDSCH) scheduling rate) downlink data is smaller than a threshold value, the electronic device 101 may determine that the SRS limitation condition has been identified. As another example, if the SRS output power is significantly greater than a maximum power supported by the electronic device 101, a gain of a downlink throughput may not be large. In consideration of a tradeoff between current consumption and a gain of a downlink throughput, if a difference between the SRS output power and the maximum output power is greater than a threshold value, the electronic device 101 may determine that the SRS limitation condition has been identified. In another example, if a transmission power of NR communication is equal to or less than a specific value, the electronic device 101 may determine that the SRS limitation condition has been identified. In another example, the electronic device 101 may determine whether the SRS limitation condition has been identified, based on a type of a running application or various parameters (e.g., rank, bandwidth, amount of RB allocation, and/or modulation and code schemes (MCS)) associated with downlink. The electronic device 101 may determine whether one or more SRS limitation conditions have been identified.

According to various embodiments, if it is determined that the SRS limitation condition is not satisfied (No in 1303), the electronic device 101 may adjust an output power value of LTE communication and identify a second maximum value of an output power available in NR, which corresponds to the adjusted value, in operation 1305. In operation 1307, the electronic device 101 may transmit an SRS, based on the second maximum value and the SRS output power. If it is determined that the SRS limitation condition is satisfied (Yes in 1303), the electronic device 101 may transmit the SRS in operation 1309 on the basis of the SRS output power without a back-off for the output power of LTE communication. The SRS limitation condition being satisfied indicates a case in which the gain of the downlink throughput is not large even when the SRS is transmitted, and thus the electronic device 101 may be configured not to back-off LTE.

Figure 14:
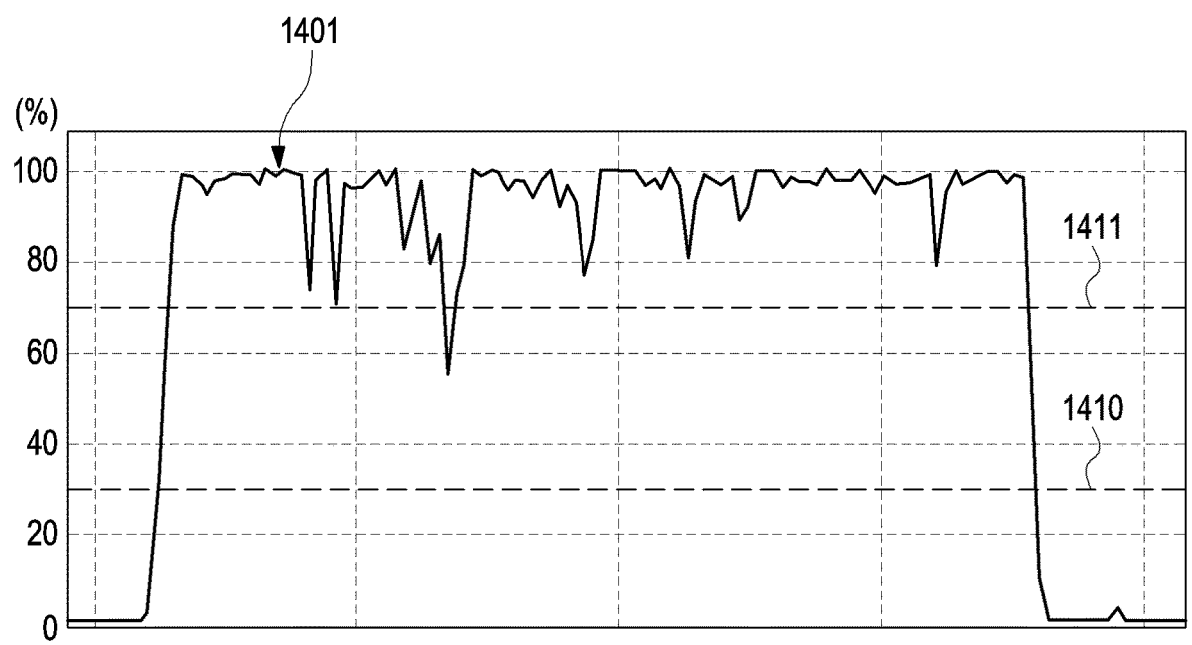
FIG. 14 is a diagram illustrating a change in a PDSCH scheduling rate according to various embodiments.

FIG. 14 is a graph illustrating a change in a PDSCH scheduling rate according to various embodiments.

According to various embodiments, the electronic device 101 (e.g., at least one of the processor 120, the first communication processor 212, the second communication processor 214, or the integrated communication processor 260) may identify a scheduling rate 1401 of PDSCH on the basis of whether each of slots of the PDSCH is scheduled. For example, the electronic device 101 may identify, as a PDSCH scheduling rate, a ratio of scheduled slots among all PDSCH slots for a predetermined period (e.g., 100 ms or 1 s), and accordingly, the ratio may be expressed as a value of 0 or 1, or as a percentage (%). If, for example, there are 100 reception occasions during a specified period of 100 ms, the electronic device 101 may count the number of times of performed data reception among the reception occasions so as to determine the ratio. If data reception has been performed 30 times, the PDSCH scheduling rate may be 30%.

According to various embodiments, if, for example, the PDSCH scheduling rate is included in a first range, the electronic device 101 may determine that the SRS limitation condition is satisfied. The first range may be a range of the PDSCH scheduling rate, in which a gain of a downlink throughput is relatively low. The first range may be, for example, a range in which the PDSCH scheduling rate is equal to or lower than a first threshold value (e.g., 30%) 1410. Those skilled in the art will understand that the PDSCH scheduling rate may be referred to as a downlink scheduling ratio, and if a parameter is capable of indicating a size of downlink data, the parameter may be used interchangeably with the PDSCH scheduling rate.

According to various embodiments, if the PDSCH scheduling rate is not included in the first range, the electronic device 101 may back-off a PUSCH transmission power of LTE communication, based on that an SRS output power exceeds a maximum value of an output power available in the NR. If the PDSCH scheduling rate is included in the first range, the electronic device 101 may not back-off the PUSCH transmission power of LTE communication even if the SRS output power exceeds the maximum value of the output power available in the NR. According to various embodiments, the electronic device 101 may operate so that execution of SRS transmission limitation and stopping of the SRS transmission limitation have hysteresis characteristics. For example, while a back-off of the PUSCH transmission power of LTE communication is being performed, if the PDSCH scheduling rate is equal to or lower than the first threshold value (e.g., 30%), the electronic device 101 may stop the back-off of the PUSCH transmission power of LTE communication. While the back-off of the PUSCH transmission power of LTE communication is not being performed, if the PDSCH scheduling rate is equal to or higher than a second threshold value (e.g., 70%) 1411 greater than the first threshold value (e.g., 30%), the electronic device 101 may perform the back-off of the PUSCH transmission power of LTE communication. The first threshold value and the second threshold value are not limited. In another embodiment, the electronic device 101 may be configured not to back-off the PUSCH transmission power of LTE communication in a case of being equal to or less than a single threshold value, and to back-off the PUSCH transmission power of LTE communication in a case of exceeding the single threshold value.

As one example, the electronic device 101 may identify the back-off amount of the PUSCH transmission power of LTE communication, based on association information in Table 4. Table 5 shows a state change with respect to an initial state of the electronic device 101.

TABLE 5

<initial state ⇒ changed state>
NR SRS mode = true (40 ms) ⇒ true (40 ms) [no change]
LTE uplink block error rate 40% ⇒ 20% [below threshold]
MAX LTE PUSCH backoff = 6 dBm ⇒ 6 dBm [no change]
VoLTE flag = false ⇒ false [no change]
NR SRS target power 20 dBm ⇒ 23 dBm
LTE PUSCH power 20 dBm ⇒ 20 dBm [No change]
DPS NR MAX POWER LIMIT 20 dBm ⇒ 20 dBm
[No change]
LTE PUCCH power 10 dBm ⇒ 10 dBm [No change]
Downlink scheduling rate 50% ⇒ 80%
[equal to or greater than threshold rate]

In the initial state, the SRS output power of NR communication is 20 dBm and is equal to or less than the NR maximum output power according to DPS, which is 20 dBm, so that there is no limitation. However, in a changed state, the SRS output power is 23 dBm and is thus limited by 20 dBm that is the NR maximum output power according to DPS. The electronic device 101 may back-off the PUSCH transmission power of LTE communication, based on that a mode is determined to be the SRS mode (SRS transmission period: 40 ms), VoLTE is not being performed, the communication quality of LTE communication is good (BLER: 20%), and the SRS limitation condition is not satisfied (downlink scheduling rate: 80%). For example, the electronic device 101 may back-off the PUSCH transmission power of LTE communication by 3 dB, and may configure the PUSCH transmission power of LTE communication to 17 dBm. As the PUSCH transmission power of LTE communication is configured to 17 dBm, the NR maximum output power according to DPS may be increased to 23 dBm. Accordingly, the electronic device 101 may transmit an SRS with the SRS output power of 23 dBm.

Figure 15:
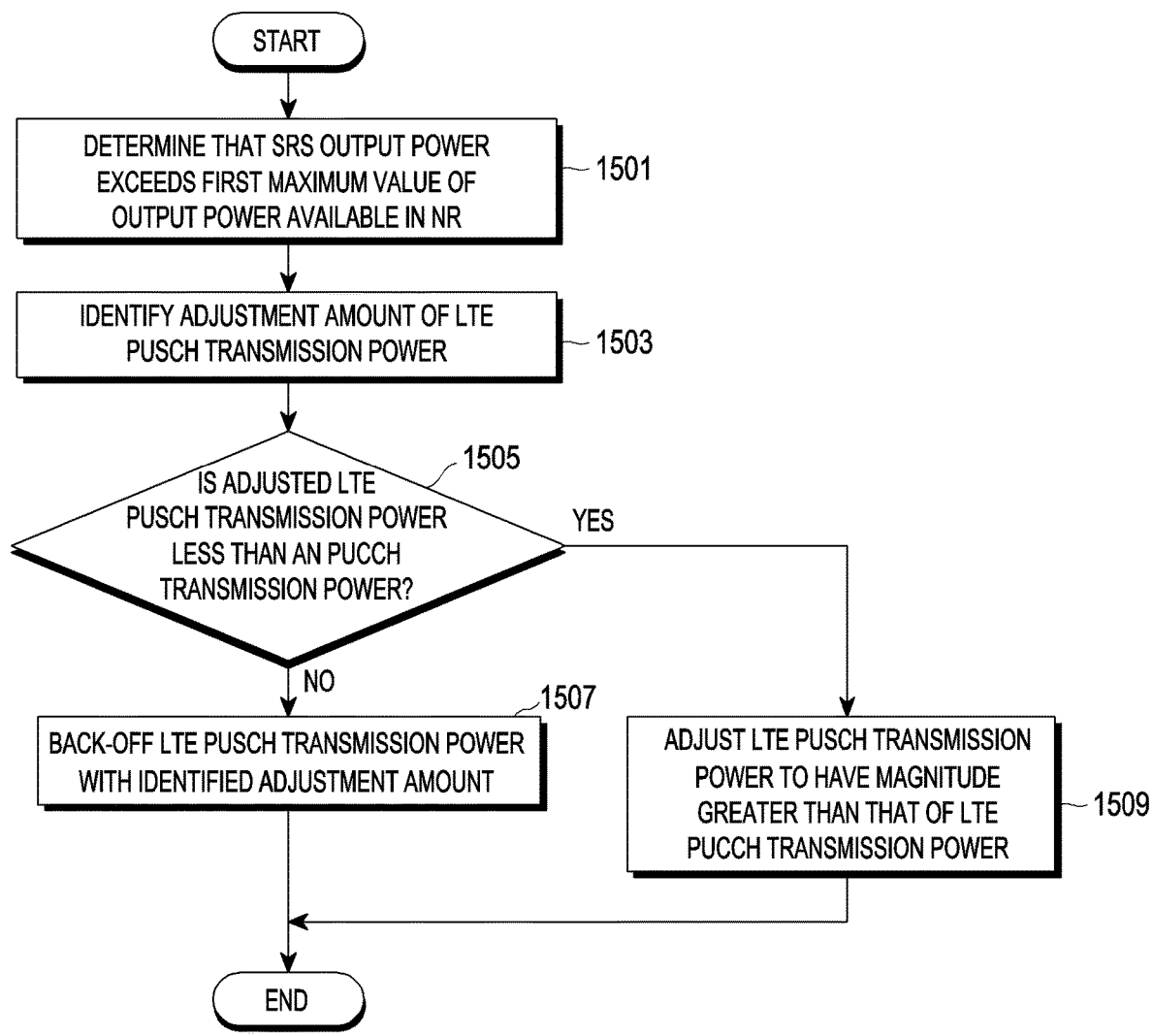
FIG. 15 is a flowchart illustrating an example method of operating the electronic device according to various embodiments.
Figure 16:
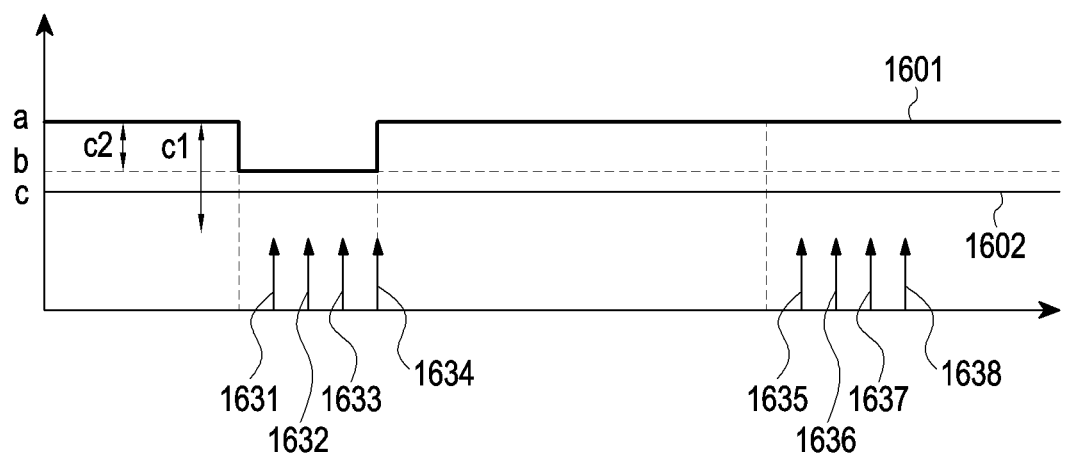
FIG. 16 is a diagram illustrating a PUSCH and a PUCCH of LTE communication according to various embodiments.

FIG. 15 is a flowchart illustrating an example method of operating the electronic device according to various embodiments. The embodiment of FIG. 15 will be described with reference to FIG. 16. FIG. 16 illustrates a PUSCH and a PUCCH of LTE communication according to various embodiments.

According to various embodiments, the electronic device 101 (e.g., at least one of the processor 120, the first communication processor 212, the second communication processor 214, or the integrated communication processor 260) may determine, in operation 1501, that an SRS output power exceeds a first maximum value of an output power available in NR. In operation 1503, the electronic device 101 may identify an adjustment amount of an LTE PUSCH transmission power. For example, referring to FIG. 16, the electronic device 101 may identify that, in a state where the LTE PUSCH transmission power is configured to a, the SRS output power exceeds the maximum value of the output power available in NR. The electronic device 101 may identify, as c1, the adjustment amount of the PUSCH transmission power of LTE communication.

According to various embodiments, the electronic device 101 may determine, in operation 1505, whether the adjusted LTE PUSCH transmission power is less than an LTE PUCCH transmission power. If it is determined that the LTE PUSCH transmission power is not less than the LTE PUCCH transmission power (No in 1505), the electronic device 101 may back-off the LTE PUSCH transmission power with the identified adjustment amount in operation 1507. If it is determined that the LTE PUSCH transmission power is less than the LTE PUCCH transmission power (Yes in 1505), the electronic device 101 may adjust the LTE PUSCH transmission power in operation 1509 so as to maintain a magnitude of the LTE PUSCH transmission power to be greater than that of the LTE PUCCH transmission power. For example, in FIG. 16, if the LTE PUSCH transmission power is backed-off by c1, the PUSCH transmission power 1601 of LTE communication may be less than the PUCCH transmission power 1602. The electronic device 101 may perform the back-off by c2 instead of performing the back-off by c1, thereby maintaining the magnitude of the LTE PUSCH transmission power 1601 greater than the magnitude of the LTE PUCCH transmission power 1602 while SRSs 1631,1632,1633,1634,1635,1636, 1637,1638 are transmitted. LTE PUCCH is a channel for transmitting a control message, and the electronic device 101 may thus prevent the LTE PUSCH transmission power 1601 from being less than the LTE PUCCH transmission power 1602. In another embodiment, if the adjusted LTE PUSCH transmission power is expected to be less than the LTE PUCCH transmission power, the electronic device 101 may be configured not to back-off the LTE PUSCH transmission power.

Figure 17:
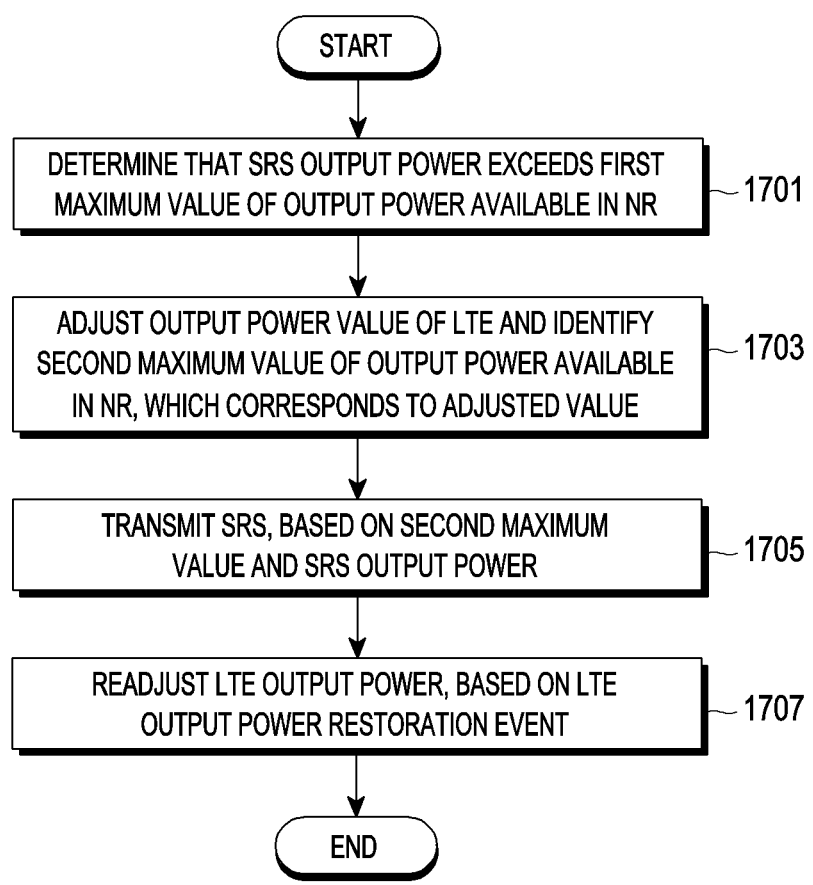
FIG. 17 is a flowchart illustrating an example method of operating the electronic device according to various embodiments.

FIG. 17 is a flowchart illustrating an example method of operating the electronic device according to various embodiments.

According to various embodiments, the electronic device 101 (e.g., at least one of the processor 120, the first communication processor 212, the second communication processor 214, or the integrated communication processor 260) may determine, in operation 1701, that an SRS output power exceeds a first maximum value of an output power available in NR. In operation 1703, the electronic device 101 may adjust an output power value of LTE communication, and may identify a second maximum value of an output power available in NR, which corresponds to the adjusted value. In operation 1705, the electronic device 101 may transmit an SRS, based on the second maximum value and the SRS output power.

According to various embodiments, the electronic device 101 may readjust the LTE output power in operation 1707, based on an LTE output power restoration event. If the electronic device 101 has adjusted the LTE PUSCH transmission power by adjusting an LTE PUSCH output power limit, the electronic device 101 may restore the LTE PUSCH output power limit. For example, when SRS transmission ends, the electronic device 101 may readjust the LTE output power. Alternatively, after the SRS transmission ends, the electronic device 101 may readjust the LTE output power after an additional margin (e.g., additional SRS transmission or specified time (e.g., 1 second)). The electronic device 101 may configure a margin before the SRS transmission as well as configure a margin after the SRS transmission ends. The electronic device 101 may be configured to back-off the LTE output power from a time point before the margin after a time point of the SRS transmission time.

Figure 18:
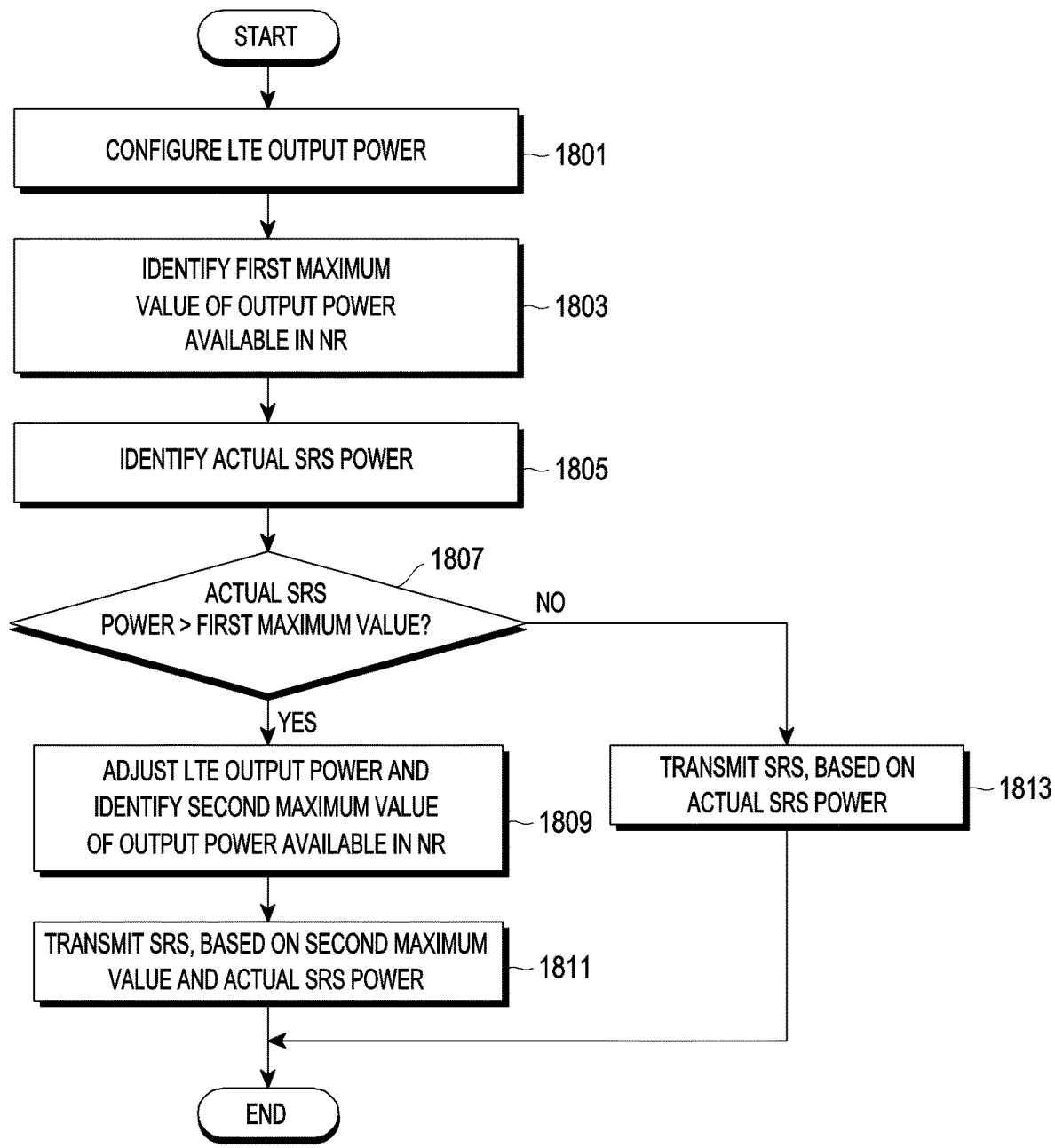
FIG. 18 is a flowchart illustrating an example method of operating the electronic device according to various embodiments.
Figure 19:
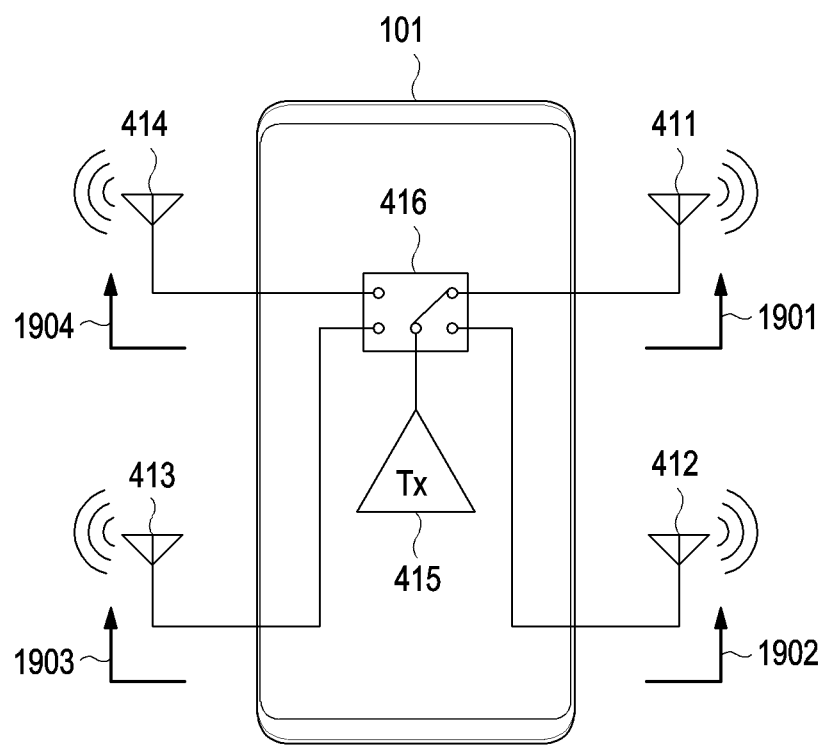
FIG. 19 is a diagram illustrating an RF path-loss for each of antennas of the electronic device according to various embodiments.

FIG. 18 is a flowchart illustrating an example method of operating the electronic device according to various embodiments. The embodiment of FIG. 18 will be described with reference to FIG. 19. FIG. 19 is a diagram illustrating an RF path-loss for each of antennas of the electronic device according to various embodiments.

According to various embodiments, the electronic device 101 (e.g., at least one of the processor 120, the first communication processor 212, the second communication processor 214, or the integrated communication processor 260) may configure, in operation 1801, an output power value of LTE communication, for example, a transmission power of PUSCH, according to Equation 2. In operation 1803, the electronic device 101 may identify a first maximum value of an output power available in NR, which corresponds to the configured value. For example, the electronic device 101 may identify the first maximum value of the output power available in NR, which corresponds to the configured value, based on association information between power values as shown in Table 1.

According to various embodiments, the electronic device 101 may identify an actual SRS power in operation 1805. Here, the actual SRS power may be determined based on an SRS output power, an RF path-loss for SRS transmission, and a maximum amplifier output power for SRS transmission. Referring to FIG. 19, the electronic device 101 may amplify an SRS via at least one power amplifier 415, and may transmit, via at least one switch 416, the amplified SRS to the first antenna 411, the second antenna 412, the third antenna 413, and the fourth antenna 414. A path for transmission to the first antenna 411 via at least one power amplifier 415 may be referred to as a first RF path 1901, a path for transmission to the second antenna 412 through at least one power amplifier 415 may be referred to as a second RF path 1902, a path for transmission to the third antenna 413 through at least one power amplifier 415 may be referred to as a third RF path 1903, and a path for transmission to the fourth antenna 414 through at least one power amplifier 415 may be referred to as a fourth RF path 1904. Depending on implementation of the electronic device 101, RF path-losses for the first RF path 1901, the second RF path 1902, the third RF path 1903, and the fourth RF path 1904 may be different, respectively. Accordingly, characteristics shown in Table 6 may be identified for each of the first antenna 411, the second antenna 412, the third antenna 413, and the fourth antenna 414.

TABLE 6

| Antenna Port (antenna) | Port 0 (first antenna 411) | Port 1 (second antenna 412) | Port 2 (third antenna 413) | Port 3 (fourth antenna 414) |
| --- | --- | --- | --- | --- |
| SRS Output Power | 23 dBm | | | |
| SRS RF Path-loss | 1 dB | 5 dB | 10 dB | 5 dB |
| Amplifier Output (Max 26 dBm) | 24 dBm | 26 dBm (MAX) | 26 dBm (MAX) | 26 dBm (MAX) |
| Actual SRS Power | 23 dBm | 21 dBm | 16 dBm | 21 dBm |

For example, the electronic device 101 may identify SRS output powers (e.g., 23 dBm) according to Equation 3. In this example, the SRS output powers are assumed to be the same for the respective antennas, but may be different. A path-loss of the first RF path 1901 is 1 dB, a path-loss of the second RF path 1902 is 5 dB, a path-loss of the third RF path 1903 is 10 dB, a path-loss of the fourth RF path 1904 is 5 dB, wherein the path loses are caused by hardware characteristics. An output of at least one amplifier 415 may be up to 26 dBm. With respect to the first antenna 411, in order to satisfy the SRS output power of 23 dBm, the electronic device 101 may control at least one amplifier 415 to output a power of 24 dBm. Accordingly, the actual SRS power corresponding to the first antenna 411 may be 23 dBm obtained by subtracting a path-loss of 1 dB from 24 dBm. The actual SRS power may refer to power that may be actually applied to a corresponding antenna when at least one amplifier 415 is controlled to satisfy the SRS output power. With respect to the second antenna 412, in order to satisfy the SRS output power of 23 dBm, the electronic device 101 may control at least one amplifier 415 to output a power of 26 dBm. Accordingly, the actual SRS power corresponding to the second antenna 412 may be 21 dBm obtained by subtracting a path-loss of 5 dB from 26 dBm. The maximum output of at least one amplifier 415 is 26 dBm, and therefore the actual SRS power of 21 dBm for the second antenna 412 may be less than the SRS output power of 23 dBm. With respect to the third antenna 413, in order to satisfy the SRS output power of 23 dBm, the electronic device 101 may control at least one amplifier 415 to output a power of 26 dBm. Accordingly, the actual SRS power corresponding to the third antenna 413 may be 16 dBm obtained by subtracting a path-loss of 10 dB from 26 dBm. The maximum output of at least one amplifier 415 is 26 dBm, and therefore the actual SRS power of 16 dBm for the third antenna 413 may be less than the SRS output power of 23 dBm. With respect to the fourth antenna 414, in order to satisfy the SRS output power of 23 dBm, the electronic device 101 may control at least one amplifier 415 to output a power of 26 dBm. Accordingly, the actual SRS power corresponding to the fourth antenna 414 may be 21 dBm obtained by subtracting a path-loss of 5 dB from 26 dBm. The maximum output of at least one amplifier 415 is 26 dBm, and therefore the actual SRS power of 21 dBm for the fourth antenna 414 may be less than the SRS output power of 23 dBm.

Referring back to FIG. 18, according to various embodiments, in operation 1807, the electronic device 101 may determine whether the actual SRS power is greater than the maximum value of the output power available in NR. If the actual SRS power is greater than the maximum value of the output power available in NR (Yes in 1807), the electronic device 101 may adjust the output power value of LTE communication and identify a second maximum value of the output power available in NR, which corresponds to the adjusted value, in operation 1809. For example, the electronic device 101 may back-off the output power value of LTE communication, and accordingly, the maximum value of the output power available in NR may increase. In operation 1811, the electronic device 101 may transmit an SRS, based on the second maximum value and the actual SRS power. For example, the electronic device 101 may transmit the SRS with a smaller value between the second maximum value and the actual SRS power. If the actual SRS power is not greater than the maximum value of the output power available in NR (No in 1807), the electronic device 101 may transmit the SRS on the basis of the actual SRS power in operation 1813. If an uplink maximum output power of NR communication according to DPS is 17 dBm, the actual SRS power corresponding to the first antenna 411, the second antenna 412, and the fourth antenna 414 may be limited by the maximum output power of NR communication, and the actual SRS power corresponding to the third antenna 413 may not be limited by the maximum output power of NR communication. When DPS operation is performed between LTE PUSCH and NR SRS transmissions, the electronic device 101 may back-off PUSCH of LTE communication during SRS transmission corresponding to the first antenna 411, the second antenna 412, and the fourth antenna 414, and may not back-off PUSCH of LTE communication during SRS transmission corresponding to the third antenna 413.

As described above, the electronic device 101 according to various embodiments may use the actual SRS power in the embodiment of FIG. 18 instead of the SRS output power in the embodiment of FIG. 9. Those skilled in the art will understand that not only the SRS output power of the embodiment in FIG. 9 but also the SRS output power of various embodiments in the disclosure may be replaced with the actual SRS power.

Figure 20:
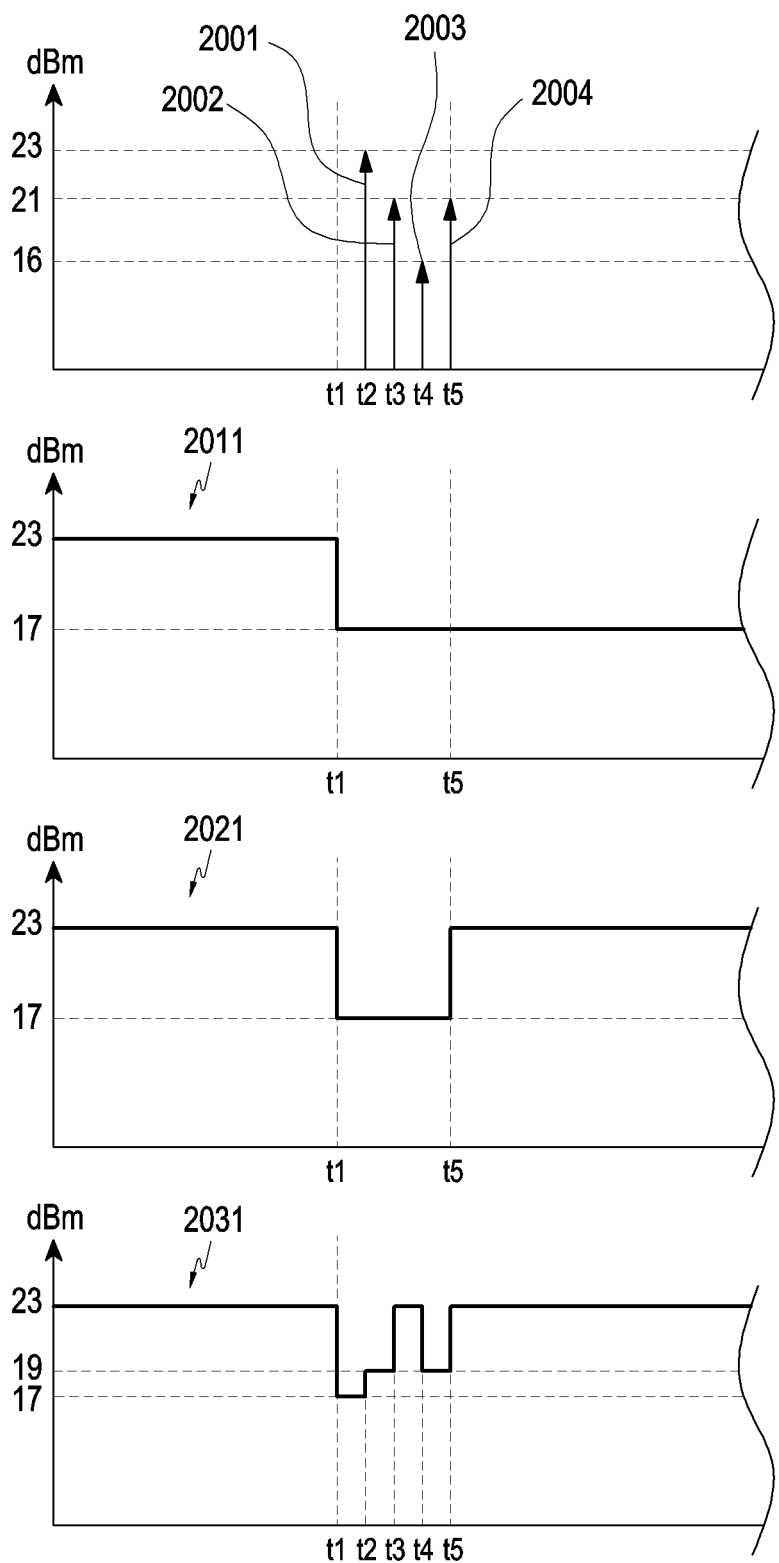
FIG. 20 is a diagram illustrating backoff of a transmission power of an LTE PUSCH and an actual SRS power according to various embodiments.

FIG. 20 is a diagram illustrating example backoff of a transmission power of an LTE PUSCH and an actual SRS power according to various embodiments.

According to various embodiments, the electronic device 101 may have the characteristics shown in Table 6, the actual SRS power corresponding to the first antenna 411 may be 23 dBm, the actual SRS power corresponding to the second antenna 412 may be 21 dBm, the actual SRS power corresponding to the third antenna 413 may be 16 dBm, and the actual SRS power corresponding to the fourth antenna 414 may be 21 dBm. A period configured for SRS transmission may be, for example, periods t1 to t5 (e.g., including t1, t2, t3, t4 and t5). In FIG. 20, actual SRS powers 2001, 2002, 2003, and 2004 are illustrated for transmission time points t2, t3, t4, and t5 for each of antenna ports. The actual SRS powers 2001, 2002, 2003, and 2004 may be 23 dBm, 21 dBm, 16 dBm, and 21 dBm respectively, as shown in Table 6. In the embodiment, the PUSCH transmission power of LTE communication may be 23 dBm, the maximum uplink value of NR communication according to DSP may be 17 dBm. The electronic device 101 may determine that the actual SRS powers 2001, 2002, and 2004 are limited by 17 dBm that is the maximum uplink value of NR communication according to DSP, and the actual SRS power 2003 is not limited by 17 dBm that is the maximum uplink value of NR communication according to DSP. Based on that the actual SRS powers 2001, 2002, and 2004 are limited by 17 dBm that is the maximum uplink value of NR communication according to DSP, the electronic device 101 may back-off the PUSCH transmission power of LTE communication.

In an example, the electronic device 101 may maintain the PUSCH transmission power 2011 of LTE communication at 23 dBm and then may back-off the PUSCH transmission power 2011 of LTE communication from t1 that is a time point configured for SRS transmission. For example, the electronic device 101 may maintain the back-off during an SRS transmission period (e.g., 40 ms). For example, the electronic device 101 may maintain the back-off until a restoration event is generated. In another example, the electronic device 101 may maintain the PUSCH transmission power 2021 of LTE communication at 23 dBm and then may back-off the PUSCH transmission power 2021 of LTE communication during periods t1 to t5 that are configured for SRS transmission. If periods t1 to t5 configured for SRS transmission expire, the electronic device 101 may restore the PUSCH transmission power 2021 of LTE communication. In another example, the electronic device 101 may configure a back-off size of the PUSCH transmission power 2021 of LTE communication differently for each actual SRS power. For example, the actual SRS power 2001 may be 23 dBm, and the electronic device 101 may back-off the PUSCH transmission power 2031 of LTE communication to 17 dBm. For example, the actual SRS powers 2002 and 2004 may be 21 dBm, and the electronic device 101 may back-off the PUSCH transmission power 2031 of LTE communication to 19 dBm. For example, the actual SRS power 2003 is 16 dBm and is not limited due to DPS, and therefore the electronic device 101 may not back-off the PUSCH transmission power 2031 of LTE communication.

According to various example embodiments, an electronic device may include: multiple antennas configured to support LTE communication and NR communication, a memory configured to store association information between first multiple output powers used for the LTE communication and second multiple output powers used for the NR communication corresponding to the first multiple output powers, respectively, and at least one processor, wherein the second multiple output powers may include maximum values to be used in the NR communication, which are limited by the first multiple output powers respectively, based on the LTE communication and the NR communication being concurrently performed, and the at least one processor may be configured to configure an LTE transmission power to be used for data transmission in a physical uplink shared channel (PUSCH) of the LTE communication, identify a first NR output power maximum value corresponding to the LTE transmission power based on the association information, identify a sounding reference signal (SRS) output power to be used for SRS transmission through at least one of the multiple antennas, and at least temporarily reduce the LTE transmission power based on the SRS output power being greater than the first NR output power maximum value. The sum of the LTE transmission power and the first NR output power maximum value may have a value less than a maximum output power configured for the electronic device.

According to various example embodiments, the at least one processor may be further configured to: identify, based on the association information, a second NR output power maximum value corresponding to the reduced LTE transmission power, and control the electronic device to transmit the SRS with an SRS transmission power determined based on the second NR output power maximum value and the SRS output power. The sum of the reduced LTE transmission power and the second NR output power maximum value may have a value less than the maximum output power configured for the electronic device.

According to various example embodiments, the at least one processor may be configured to, based on the SRS output power being greater than the first NR output power maximum value, as at least a part of reducing the LTE transmission power, determine whether VoLTE communication is performed based on the LTE communication, and to reduce the LTE transmission power based on determining that the VoLTE communication is not performed.

According to various example embodiments, the at least one processor may be configured to, based on the SRS output power being greater than the first NR output power maximum value, as at least a part of reducing the LTE transmission power, identify at least one indicator associated with a communication quality of the LTE communication, and to reduce the LTE transmission power based on the at least one indicator satisfying a specified condition.

According to various example embodiments, the at least one processor may be configured to, based on the SRS output power being greater than the first NR output power maximum value, as at least a part of reducing the LTE transmission power, identify at least one indicator associated with a downlink size of the NR communication, and to reduce the LTE transmission power based on the at least one indicator satisfying a specified condition.

According to various example embodiments, the at least one processor may be configured to, based on that the at least one indicator satisfying the specified condition, as at least a part of reducing the LTE transmission power, reduce the LTE transmission power based on a scheduling rate of a physical downlink shared channel (PDSCH) corresponding to the NR from among the at least one indicator not included in a first range.

According to various example embodiments, the at least one processor may be configured to, based on the SRS output power being greater than the first NR output power maximum value, as at least a part of reducing the LTE transmission power, identify an output power of the NR communication, and to reduce the LTE transmission power based on the output power of the NR communication satisfying a specified condition.

According to various example embodiments, the at least one processor may be configured to, based on the SRS output power being greater than the first NR output power maximum value, as at least a part of reducing the LTE transmission power, reduce the LTE transmission power to a back-off size configured to be less than a specified back-off size.

According to various example embodiments, the at least one processor may be configured to, based on the SRS output power being greater than the first NR output power maximum value, as at least a part of reducing the LTE transmission power, identify a PUCCH transmission power of the LTE communication, and to reduce the LTE transmission power to have a magnitude greater than that of the PUCCH transmission power of the LTE communication.

According to various example embodiments, the at least one processor may be configured to, based on the SRS output power being greater than the first NR output power maximum value, as at least a part of reducing the LTE transmission power, reduce the LTE transmission power during an SRS transmission period corresponding to the SRS, which corresponds to the SRS output power greater than the first NR output power maximum value, to reduce the LTE transmission power during a period in which multiple SRSs are transmitted from among SRS transmission periods corresponding to the SRS, which corresponds to the SRS output power greater than the first NR output power maximum value, or to reduce the LTE transmission power during a period, in which the SRS is transmitted, which corresponds to the SRS output power greater than the first NR output power maximum value.

According to various example embodiments, an electronic device may include: multiple antennas configured to support LTE communication and NR communication, a memory configured to store association information between first multiple output powers used for the LTE communication and second multiple output powers used for the NR communication corresponding to the first multiple output powers, respectively, at least one processor, and at least one amplifier configured to amplify and apply SRSs to the multiple antennas respectively, wherein the second multiple output powers may include maximum values to be used in the NR communication, which are limited by the first multiple output powers respectively, based on the LTE communication and the NR communication being concurrently performed, and the at least one processor may be configured to: configure an LTE transmission power to be used for data transmission in a physical uplink shared channel (PUSCH) of the LTE communication, identify a first NR output power maximum value corresponding to the LTE transmission power based on the association information, identify a sounding reference signal (SRS) output power to be used for SRS transmission through at least one of the multiple antennas, identify an actual SRS power based on the SRS output power, a maximum output of the at least one amplifier, and multiple RF path-losses corresponding to the respective multiple antennas, and at least temporarily reduce the LTE transmission power based on the actual SRS power being greater than the first NR output power maximum value. The sum of the LTE transmission power and the first NR output power maximum value may be less than a maximum output power configured for the electronic device.

According to various example embodiments, the at least one processor may be further configured to: identify, based on the association information, a second NR output power maximum value corresponding to the reduced LTE transmission power, and control the electronic device to transmit the SRS with an SRS transmission power determined based on the second NR output power maximum value and the actual SRS power. The sum of the reduced LTE transmission power and the second NR output power maximum value may have a value smaller than the maximum output power configured for the electronic device.

According to various example embodiments, the at least one processor may be configured to, based on the actual SRS power being greater than the first NR output power maximum value, as at least a part of reducing the LTE transmission power, determine whether VoLTE communication is performed based on the LTE communication, and to reduce the LTE transmission power based on determination that the VoLTE communication is not performed.

According to various example embodiments, the at least one processor may be configured to, based on the actual SRS power being greater than the first NR output power maximum value, as at least a part of reducing the LTE transmission power, identify at least one indicator associated with a communication quality of the LTE communication, and to reduce the LTE transmission power based on the at least one indicator satisfying a specified condition.

According to various example embodiments, the at least one processor may be configured to, based on the actual SRS power being greater than the first NR output power maximum value, as at least a part of reducing the LTE transmission power, identify at least one indicator associated with a downlink size of the NR communication, and to reduce the LTE transmission power based on the at least one indicator satisfying a specified condition.

According to various example embodiments, the at least one processor may be configured to, based on the at least one indicator satisfying the specified condition, as at least a part of reducing the LTE transmission power, reduce the LTE transmission power based on a scheduling rate of a physical downlink shared channel (PDSCH) corresponding to the NR from among the at least one indicator is not included in a first range.

According to various example embodiments, the at least one processor may be configured to, based on the actual SRS power being greater than the first NR output power maximum value, identify, as at least a part of reducing the LTE transmission power, an output power of the NR communication, and to reduce the LTE transmission power based on the output power of the NR communication satisfying a specified condition.

According to various example embodiments, the at least one processor may be configured to, based on the actual SRS power being greater than the first NR output power maximum value, as at least a part of reducing the LTE transmission power, reduce the LTE transmission power to a back-off size configured to be less than a specified back-off size.

According to various example embodiments, the at least one processor may be configured to, based on the actual SRS power being greater than the first NR output power maximum value, as at least a part of reducing the LTE transmission power, identify a PUCCH transmission power of the LTE communication, and to reduce the LTE transmission power to have a magnitude greater than that of the PUCCH transmission power of the LTE communication.

According to various example embodiments, the at least one processor may be configured to, based on the actual SRS power being greater than the first NR output power maximum value, as at least a part of reducing the LTE transmission power, reduce the LTE transmission power during an SRS transmission period corresponding to the SRS, which corresponds to the actual SRS power greater than the first NR output power maximum value, to reduce the LTE transmission power during a period in which multiple SRSs are transmitted from among SRS transmission periods corresponding to the SRS, which corresponds to the actual SRS power greater than the first NR output power maximum value, or to reduce the LTE transmission power during a period in which the SRS is transmitted, which corresponds to the actual SRS power greater than the first NR output power maximum value.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
multiple antennas configured to support long-term evolution (LTE) communication and new radio (NR) communication,
a memory configured to store association information between first multiple output powers used for the LTE communication and second multiple output powers used for NR communication corresponding to the first multiple output powers respectively, wherein the second multiple output powers include maximum values to be used in the NR communication, which are limited by the first multiple output powers respectively, based on the LTE communication and the NR communication being concurrently performed, and
at least one processor, wherein the at least one processor is configured to:
configure an LTE transmission power to be used for data transmission in a physical uplink shared channel (PUSCH) of the LTE communication,
identify a first NR output power maximum value corresponding to the LTE transmission power based on the association information, wherein a sum of the LTE transmission power and the first NR output power maximum value has a value less than a maximum output power configured for the electronic device,
identify a sounding reference signal (SRS) output power to be used for SRS transmission through at least one of the multiple antennas, and
at least temporarily reduce the LTE transmission power based on the SRS output power being greater than the first NR output power maximum value.

2. The electronic device of claim 1, wherein the at least one processor is further configured to:
based on the association information, identify a second NR output power maximum value corresponding to the reduced LTE transmission power, wherein the sum of the reduced LTE transmission power and the second NR output power maximum value has a value less than the maximum output power configured for the electronic device, and
control the electronic device to transmit the SRS with an SRS transmission power determined based on the second NR output power maximum value and the SRS output power.

3. The electronic device of claim 1, wherein the at least one processor is configured to, based on the SRS output power being greater than the first NR output power maximum value, as at least a part of reducing the LTE transmission power,
determine whether voice over long-term evolution (VoLTE) communication is performed based on the LTE communication, and
reduce the LTE transmission power based on determining that the VoLTE communication is not performed.

4. The electronic device of claim 1, wherein the at least one processor is configured to, based on the SRS output power being greater than the first NR output power maximum value, as at least a part of reducing the LTE transmission power,
identify at least one indicator associated with a communication quality of the LTE communication, and
reduce the LTE transmission power based on the at least one indicator satisfying a specified condition.

5. The electronic device of claim 1, wherein the at least one processor is configured to, based on the SRS output power being greater than the first NR output power maximum value, as at least a part of reducing the LTE transmission power,
identify at least one indicator associated with a downlink size of the NR communication, and
reduce the LTE transmission power based on the at least one indicator satisfying a specified condition.

6. The electronic device of claim 5, wherein the at least one processor is configured to, based on that the at least one indicator satisfying the specified condition, as at least a part of reducing the LTE transmission power,
reduce the LTE transmission power based on a scheduling rate of a physical downlink shared channel (PDSCH) corresponding to the NR from among the at least one indicator is not included in a first range.

7. The electronic device of claim 1, wherein the at least one processor is configured to, based on the SRS output power being greater than the first NR output power maximum value, as at least a part of reducing the LTE transmission power,
identify an output power of the NR communication, and
reduce the LTE transmission power based on the output power of the NR communication satisfying a specified condition.

8. The electronic device of claim 1, wherein the at least one processor is configured to, based on the SRS output power being greater than the first NR output power maximum value, as at least a part of reducing the LTE transmission power,
reduce the LTE transmission power to a back-off size configured to be less than a specified back-off size.

9. The electronic device of claim 1, wherein the at least one processor is configured to, based on the SRS output power being greater than the first NR output power maximum value, as at least a part of reducing the LTE transmission power,
identify a PUCCH transmission power of the LTE communication, and
reduce the LTE transmission power to have a magnitude greater than that of the PUCCH transmission power of the LTE communication.

10. The electronic device of claim 1, wherein the at least one processor is configured to, based on the SRS output power being greater than the first NR output power maximum value, as at least a part of reducing the LTE transmission power,
- reduce the LTE transmission power during an SRS transmission period corresponding to the SRS, which corresponds to the SRS output power greater than the first NR output power maximum value,
- reduce the LTE transmission power during a period, in which multiple SRSs are transmitted from among SRS transmission periods corresponding to the SRS, which corresponds to the SRS output power greater than the first NR output power maximum value, or
- reduce the LTE transmission power during a period, in which the SRS is transmitted, which corresponds to the SRS output power greater than the first NR output power maximum value.

11. An electronic device comprising:
- multiple antennas configured to support long-term evolution (LTE) communication and new radio (NR) communication,
- a memory configured to store association information between first multiple output powers used for the LTE communication and second multiple output powers used for the NR communication corresponding to the first multiple output powers respectively, wherein the second multiple output powers include maximum values to be used in the NR communication, which are limited by the first multiple output powers respectively, based on the LTE communication and the NR communication being concurrently performed,
- at least one processor, and
- at least one amplifier configured to amplify and apply sounding reference signals (SRSs) to the multiple antennas respectively, wherein the at least one processor is configured to:
- configure an LTE transmission power to be used for data transmission in a physical uplink shared channel (PUSCH) of the LTE communication;
- identify a first NR output power maximum value corresponding to the LTE transmission power based on the association information, wherein a sum of the LTE transmission power and the first NR output power maximum value has a value less than a maximum output power configured for the electronic device,
- identify an SRS output power to be used for SRS transmission through at least one of the multiple antennas,
- identify an actual SRS power based on the SRS output power, a maximum output of the at least one amplifier, and multiple RF path-losses corresponding to the respective multiple antennas, and
- at least temporarily reduce the LTE transmission power based on the actual SRS power being greater than the first NR output power maximum value.

12. The electronic device of claim 11, wherein the at least one processor is further configured to:
- based on the association information, identify a second NR output power maximum value corresponding to the reduced LTE transmission power, wherein the sum of the reduced LTE transmission power and the second NR output power maximum value has a value less than the maximum output power configured for the electronic device, and
- control the electronic device to transmit the SRS with an SRS transmission power determined based on the second NR output power maximum value and the actual SRS power.

13. The electronic device of claim 11, wherein the at least one processor is configured to, based on the actual SRS power being greater than the first NR output power maximum value, as at least a part of reducing the LTE transmission power,
- determine whether voice over long-term evolution (VoLTE) communication is performed based on the LTE communication, and
- reduce the LTE transmission power based on determining that the VoLTE communication is not performed.

14. The electronic device of claim 11, wherein the at least one processor is configured to, based on the actual SRS power being greater than the first NR output power maximum value, as at least a part of reducing the LTE transmission power,
- identify at least one indicator associated with a communication quality of the LTE communication, and
- reduce the LTE transmission power based on the at least one indicator satisfying a specified condition.

15. The electronic device of claim 11, wherein the at least one processor is configured to, based on the actual SRS power being greater than the first NR output power maximum value, as at least a part of reducing the LTE transmission power,
- identify at least one indicator associated with a downlink size of the NR communication, and
- reduce the LTE transmission power based on the at least one indicator satisfying a specified condition.

* * * * *